United States Patent
Baumann et al.

(10) Patent No.: US 6,465,123 B1
(45) Date of Patent: Oct. 15, 2002

(54) BATTERY CONTAINER AND MOTOR VEHICLE

(75) Inventors: Bernd M. Baumann, Esslingen; Johann German, Weinstadt, both of (DE)

(73) Assignee: DaimlerChrysler AG, Stuttgart (DE)

( * ) Notice: Subject to any disclaimer, the term of this patent is extended or adjusted under 35 U.S.C. 154(b) by 48 days.

(21) Appl. No.: 09/609,366

(22) Filed: Jul. 3, 2000

(30) Foreign Application Priority Data

Jul. 1, 1999 (DE) .......................... 199 30 399

(51) Int. Cl.⁷ .................... H01M 2/10; H01M 2/00
(52) U.S. Cl. .................... 429/99; 429/96; 429/97; 429/100; 429/151; 429/153; 429/159; 429/163; 429/167
(58) Field of Search .................. 429/99, 96, 97, 429/100, 151, 153, 159, 163, 167

(56) References Cited

U.S. PATENT DOCUMENTS

| | | | |
|---|---|---|---|
| 4,107,402 A | * | 8/1978 | Dougherty et al. ......... 429/120 |
| 5,392,873 A | * | 2/1995 | Masuyama et al. ........ 180/68.5 |
| 5,593,793 A | * | 1/1997 | German ...................... 439/62 |
| 5,962,159 A | * | 10/1999 | Satou et al. ................. 429/99 |

FOREIGN PATENT DOCUMENTS

| | | |
|---|---|---|
| DE | 4116253 | 6/1992 |
| DE | 19504687 | 3/1996 |
| DE | 19848646 | 4/2000 |
| JP | 08212992 | 8/1996 |
| JP | 09007564 | 1/1997 |
| JP | 09293489 | 11/1997 |
| JP | 10154494 | 6/1998 |

* cited by examiner

Primary Examiner—Patrick Ryan
Assistant Examiner—Angela J. Martin
(74) Attorney, Agent, or Firm—Crowell & Moring LLP

(57) ABSTRACT

A Battery container is provided for a plurality of cylindrical accumulator elements which are arranged parallel to one another in rows and/or layers essentially horizontally. At least one first fixing element is arranged on a bottom plate and a cover plate of the battery container. The fixing elements extend transversely to the longitudinal axes of the accumulator elements and, with a form-locking action, fix and support the accumulator elements in the horizontal and the vertical direction. In the case of a layer-type arrangement of the accumulator elements, additional fixing elements are provided which are arranged between two layers of accumulator elements respectively and which also extend transversely to the longitudinal axes of the accumulator elements and, while acting upon the accumulator elements in a form-locking manner, fix and support the accumulator elements in the horizontal and vertical direction.

32 Claims, 21 Drawing Sheets

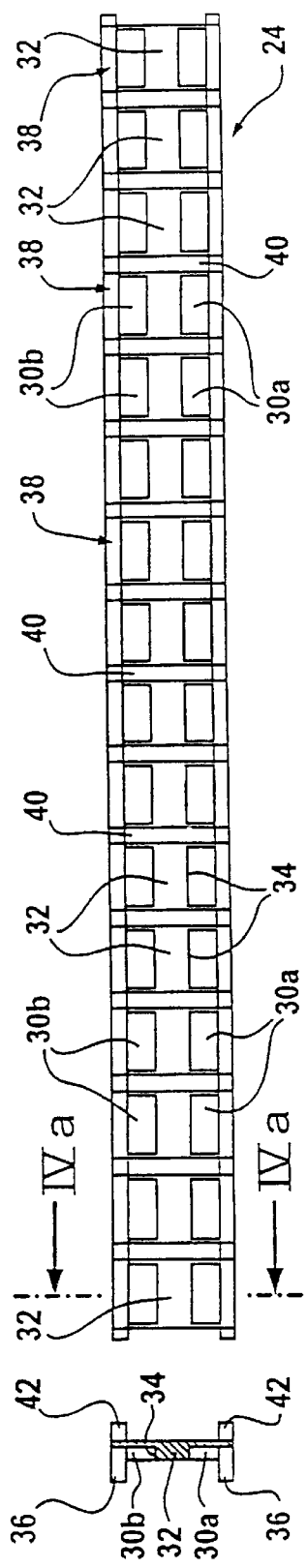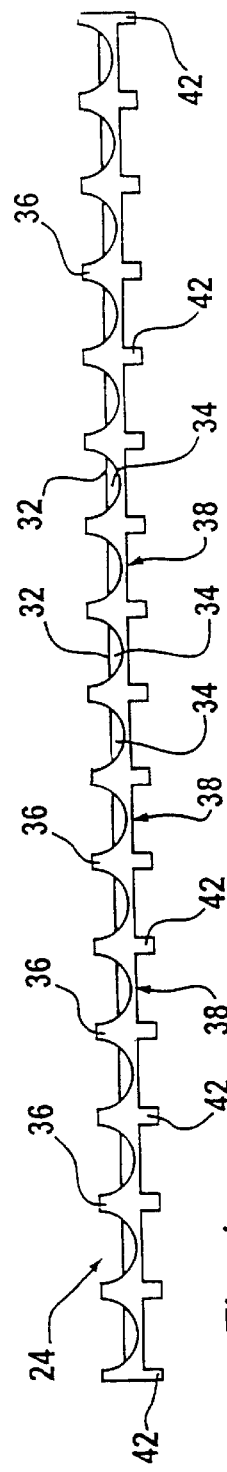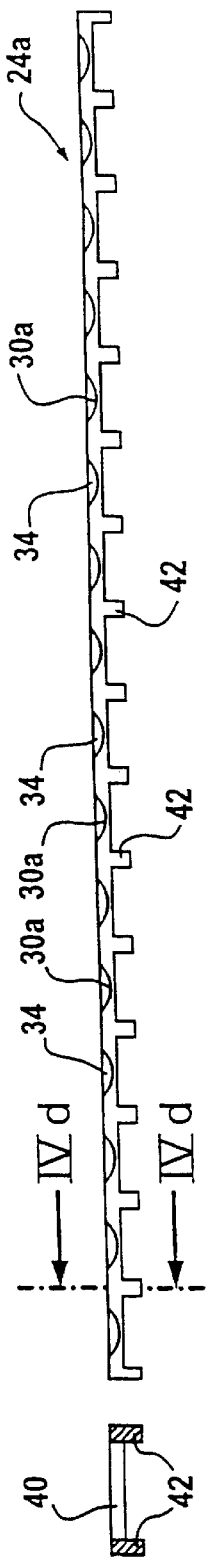
Fig. 4a  Fig. 4b  Fig. 4c  Fig. 4d  Fig. 4e

BATTERY CONTAINER AND MOTOR VEHICLE

BACKGROUND AND SUMMARY OF INVENTION

This application claims the priority of German patent application 199 30 399.1, filed Jul. 1, 1999, the disclosure of which is expressly incorporated herein by reference thereto.

The present invention relates to a battery container for a plurality of particularly cylindrical accumulator elements as well as to a motor vehicle equipped with such a battery container.

From German Patent Documents DE 41 16 253 C1 and DE 195 04 687 C1, battery containers are known which are normally fastened directly in the carrying floor structure of a motor vehicle body. A plurality of electrochemical energy accumulators, in the following called accumulator elements, are arranged in battery containers of this type. The accumulator elements may either be individual accumulator cells or several accumulator cells which are fixedly connected in series with one another to form a so-called accumulator module. From a German patent application with the File Number 198 48 646.4, which was filed by the same applicant but has not yet been published, it is known to provide an accumulator element holding device in a battery container of the above-mentioned type, which holding device comprises devices for the form-locking fixing of the accumulator cells. These devices are applied laterally and at the end side to the accumulator elements.

When designing battery containers of the above-mentioned type, it is a general goal to provide a self-supporting structure which is suitable for a free arrangement in a recess of a vehicle body, which has a weight that is as low as possible and which can accommodate a maximal number of accumulator elements while its own weight is as low as possible. Furthermore, the diversion of the extensive heat development must be ensured which occurs during the charging of the accumulator elements as well as during their power output.

Based on the above, it is an object of the invention to provide a self-supporting battery container of the above-mentioned type which ensures a defined position of the accumulator elements held therein as well as an effective moderating of the temperature.

For achieving this object, the present invention provides a battery container for a plurality particularly of cylindrical accumulator elements which are arranged parallel to one another in rows and/or layers essentially horizontally, each having at least one first fixing element arranged on a bottom plate and a cover plate of the battery container, which fixing element extends transversely to the longitudinal axes of the accumulator elements and, with a form-locking action, fixes and supports the accumulator elements in the horizontal and the vertical direction.

Accordingly, the accumulator elements are arranged in the battery container parallel to one another in rows and/or layers essentially horizontally, thus in a lying position. For holding the accumulator elements, at least one first fixing element respectively is arranged on a bottom plate and a cover plate of the battery container, which fixing element extends transversely to the longitudinal axes of the accumulator elements and which, with a form-locking action, fixes and supports the accumulator elements in a horizontal and vertical direction. By means of the fixing elements provided according to the invention, the accumulator elements, while being arranged horizontally, are in each case fixed and supported in the horizontal and in the vertical direction, whereby the accumulator elements are protected from bending as well as held immovably in the horizontal direction therefore, while the distances provided between individual accumulator elements arranged parallel to one another are maintained, which distances are important for the circulation of the cooling fluid.

Because of the arrangement of the fixing elements essentially transversely to the longitudinal axes of the accumulator elements, the accumulator elements are not supported along their outer jacket but only at individual points, whereby the moderating of the temperature, thus the removal of heat developed in the accumulator elements, is facilitated. According to the invention, the support takes place by at least one first fixing element arranged on the bottom plate and on a cover plate of the battery container. In the case of a layer-type arrangement of the accumulator elements, which particularly takes place in a coplanar arrangement of the longitudinal axes of the stacked accumulator elements, according to an advantageous further development of the invention, additional fixing elements are arranged between two layers of accumulator elements respectively, which additional fixing elements also extend transversely to the longitudinal axes of the accumulator elements and fix and support these in the horizontal and vertical direction while acting upon them in a form-locking manner. In particular, the first and additional fixing elements are each arranged above one another, whereby a particularly good stiffness of the arrangement is achieved.

As a further development of the invention, the fixing elements are arranged in the area of at least one longitudinal end of the accumulator elements. If the length of the battery container corresponds to the length of an accumulator element, the fixing elements are preferably arranged at each longitudinal end of the accumulator elements, so that each accumulator element is fixed and supported at its two longitudinal ends in the horizontal and vertical direction. As a function of the requirements, particularly according to the length of the accumulator elements, additional holders may be provided in order to prevent a bending of the accumulator elements. Holders of this type will be described in detail in the following.

If two or more accumulator elements mutually connected in the longitudinal direction are arranged in the battery container, the fixing elements are preferably arranged only between longitudinal ends of accumulator elements which are in a longitudinal connection with one another. If, for example, for each row, two accumulator elements are arranged in the battery container coaxially connected with one another at their poles by means of a suitable pole connector, one fixing element respectively is provided for their fixing and support between each layer as well as on the bottom plate and the cover plate, which fixing element extends transversely to the longitudinal direction of the accumulator elements approximately in the center of the battery container and fixes and supports the accumulator elements in the area of the pole connection in the horizontal and vertical direction.

As an advantageous further development of the invention, the bottom plate and the cover plate and the fixing elements have slots for guiding incoming air and outgoing air or cooling fluid. This measure ensures a suitable moderating of the temperature of the accumulator elements arranged in the battery container.

As a particularly advantageous embodiment of the invention, the fixing elements have pockets for the form-locking accommodation of the longitudinal ends of the accumulator elements. As a result, a particularly good fixing and support of the accumulator elements is achieved in the horizontal and vertical direction. In particular, the pockets are divided-circle-shaped recesses in the surface of the fixing elements, whose radius corresponds essentially to the radius of the essentially cylindrical accumulator elements and whose center is situated on the longitudinal axis of the accumulator elements placed therein. At the end side of the longitudinal end of the accumulator element, the pocket forms an essentially perpendicularly extending stop face, so that the accumulator element is fixed in the longitudinal direction. It was found to be particularly advantageous to lengthen the divided-circle-shaped recesses in the fixing element at least partially in a web-type manner vertically upward in order to provide the accumulator elements placed in the pocket with a hold which is as good as possible.

As an advantageous further development of the invention, the slots for guiding the cooling fluid are assigned to the pockets such that poles situated at the longitudinal ends of the accumulator elements are acted upon by a cooling fluid flow guided through the slots. This can, for example, be achieved in that, viewed in the longitudinal direction of the accumulator element, the slots are formed behind the stop face of the pocket and/or between adjacent pockets, thus diagonally next to or partially below the point at which the pole of the accumulator element comes to be situated when the accumulator element is inserted.

In order to design the entire arrangement for holding the accumulator elements to be as light as possible, the fixing elements advantageously consist of plastic, particularly of polycarbonate.

For increasing the stiffness, the fixing elements preferably have a sandwich structure.

As an advantageous embodiment of the invention, at least one spacer is provided which extends essentially parallel to the fixing elements, which prevents a bending of the accumulator elements and defines a gap between parallel accumulator elements. As a result of this measure, the number of fixing elements can be reduced to the minimum required for fixing and supporting the accumulator elements, while for the support of the accumulator elements at an opposite end or in their center, for preventing a bending and for defining a gap between individual accumulator elements, through which cooling fluid can circulate, smaller and thus lighter spacers are used which absorb only vertical forces and optionally lateral forces. However, horizontal forces in the longitudinal direction of the accumulator elements do not have to be absorbed by these spacers.

Like the fixing elements, the spacers advantageously consist of plastic, particularly of polycarbonate, and, in addition, have a sandwich structure for increasing the stiffness.

In another embodiment of the invention, the fixing elements are arranged between longitudinal ends of accumulator elements which are in a transverse connection with one another. In the case of this variant, the battery container is filled with accumulator elements which are arranged side-by-side and behind one another in rows and layers, however, a connection of individual accumulator elements not taking place between accumulator elements arranged behind one another in the longitudinal direction but between adjacent accumulator elements which are situated side-by-side. In this variant, the fixing elements preferably have at least one row of recesses for the form-locking receiving of the accumulator elements as well as pole guiding grooves assigned to one recess respectively, for guiding the pole of an accumulator element inserted in the corresponding recess. By means of such a further development of the fixing elements, a positional securing of the accumulator elements is ensured at their circumference as well as in the area of the poles. A separate guiding of the poles also facilitates the insulation with respect to the accumulator elements which are situated behind in the longitudinal direction.

In a particularly advantageous feature of preferred embodiments of the invention, the grooves are formed in a transverse strip arranged behind the recesses in the longitudinal direction of the accumulator elements to be inserted. As a result, a particularly compact construction is permitted, particularly if the transverse strip is constructed in one piece with the fixing element.

It was found to be particularly advantageous to construct the transverse strips to be lower than supporting webs arranged between the recesses, whereby, when individual fixing elements are placed upon one another, a transverse guiding is generated for pole connectors.

As another advantageous feature of preferred embodiments of the invention, the grooves are also used for guiding cooling fluid in that they have a continuous construction and the groove walls extend in the transverse direction spaced away from poles placed therein.

For an improved insulation between accumulator elements which follow one another in the longitudinal direction, insulating plates are advantageously provided at least in the area of the pole guiding grooves between fixing elements which follow one another in the longitudinal direction of the accumulator elements.

The invention also relates to a motor vehicle having a self-supporting battery container according to the invention which is preferably arranged in a suitable opening of the vehicle body or the chassis of the motor vehicle.

Further advantages and developments of the invention are indicated in the description and in the attached drawing.

It is understood that the above-mentioned characteristics, which will be explained in the following, can be used not only in the respectively indicated combination but also in other combinations or alone without leaving the scope of the present invention.

Other objects, advantages and novel features of the present invention will become apparent from the following detailed description of the invention when considered in conjunction with the accompanying drawings.

BRIEF DESCRIPTION OF THE DRAWINGS

FIGS. 4a–4e show several representations of two embodiments of a fixing element according to the invention;

DETAILED DESCRIPTION OF THE DRAWINGS

Figure 1:
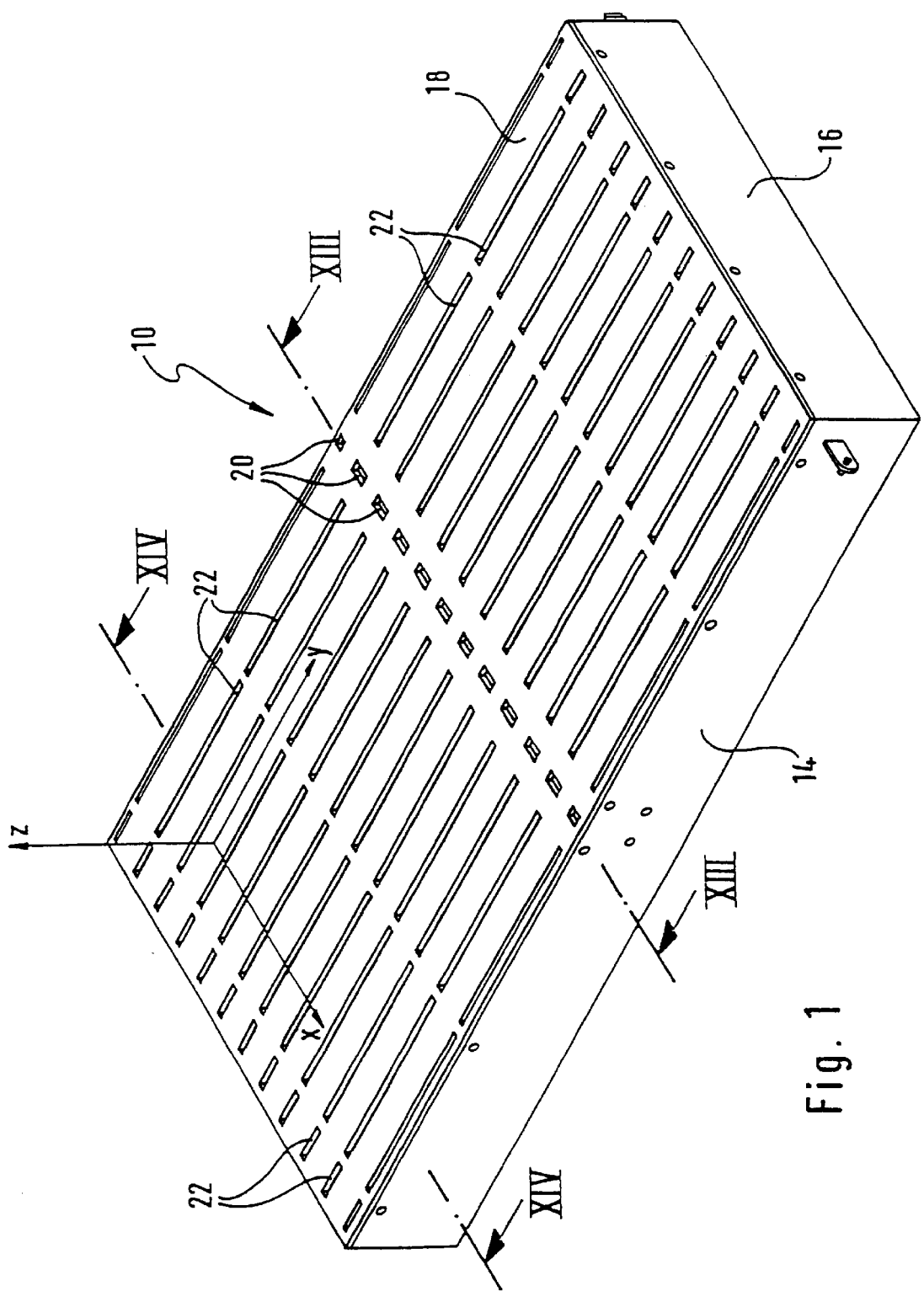
FIG. 1 is a perspective view of a battery container constructed according to a preferred embodiment of the invention.

In a perspective view, FIG. 1 shows a battery container 10 according to the invention for accommodating a plurality of cylindrical accumulator elements. The battery container 10 is composed of a bottom plate 12, of two side walls 14 and end walls 16 respectively, of which one is in each case visible in FIG. 1, and of a cover plate 18. In the bottom plate 12 and the cover plate 18, a plurality of air slots 20, 22 are in each case provided which are used for the guiding of cooling air. The battery container 10 is a self-supporting battery container which is inserted into a corresponding opening in the vehicle body or the chassis of a motor vehicle.

Figure 2:
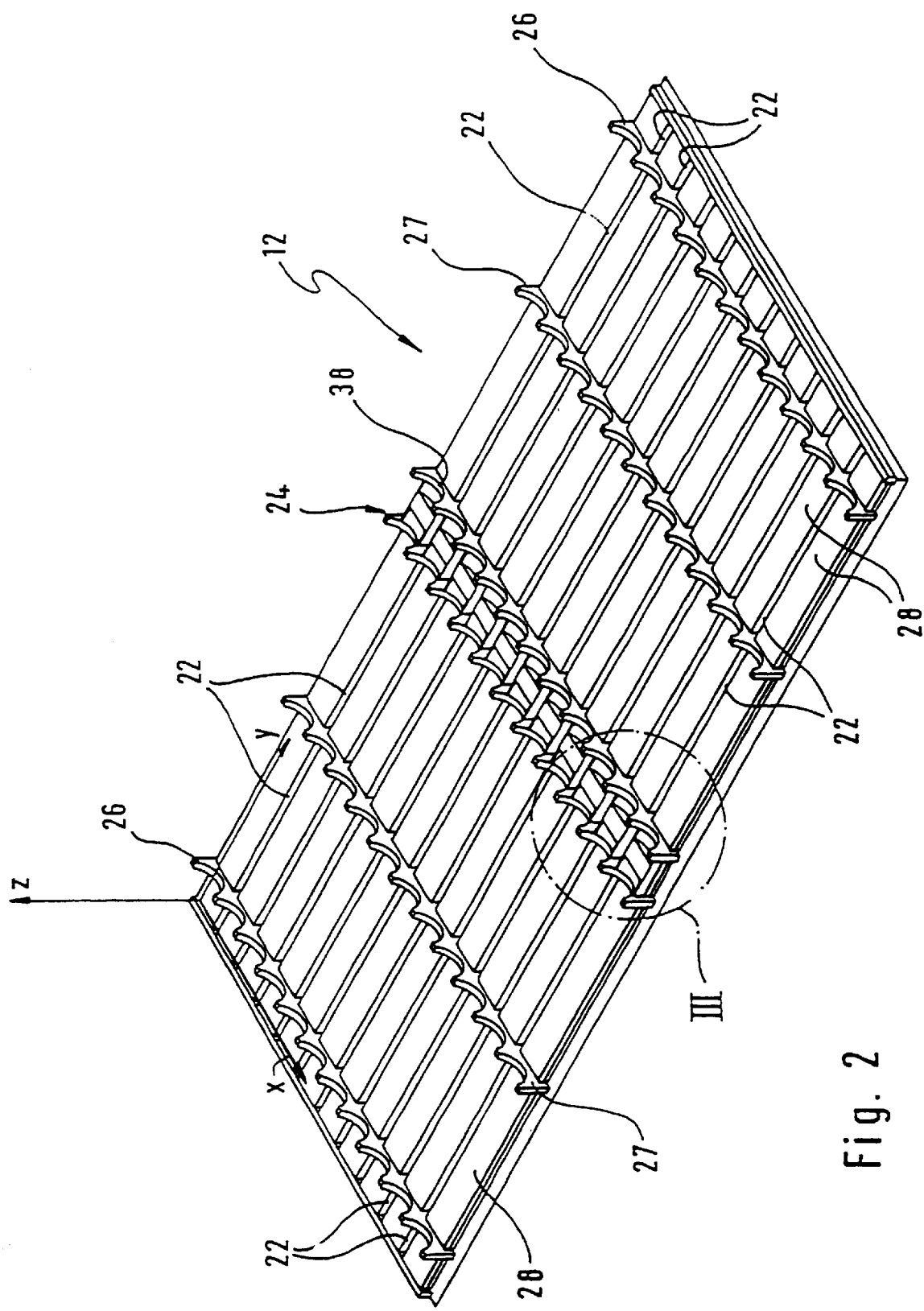
FIG. 2 is a perspective view of the bottom plate of the battery container of FIG. 1.

FIG. 2 is a perspective view of the bottom plate 12 of the battery container 10 of FIG. 1. As mentioned above, the bottom plate 12, like the cover plate 18, also has a plurality of air slots 20, 22, the air slots 20 arranged centrally in the area of the center of the cover plate not being visible in the representation of FIG. 2 because a fixing element 24 according to the invention is arranged above them. The bottom plate 12 advantageously consists of an electrically insulating light material, particularly of a polycarbonate plastic material, such as RPC. RPC has all properties important for vehicle construction; can be machined particularly well; has a high temperature stability; and is dimensionally stable and self-extinguishing. For increasing the stiffness, the bottom plate 12 is glued together in multiple layers and/or comprises one or several sandwich structures, as described in the following.

The fixing element 24, which is preferably fixedly arranged on the bottom plate 12, extends essentially perpendicularly to the longitudinal direction Y of the bottom plate 12 from one lateral edge to another. On the two longitudinal ends of the bottom plate 12 at a narrow distance from the end edges, spacers 26 are also preferably arranged in a fixed manner which extend parallel to the fixing element 24. Additional spacers 27 are also fastened parallel to the fixing element 24 and the spacer 26 approximately in the center between the fixing element 24 and the spacer 26. The number of spacers is selected according to the requirements and particularly as a function of the length of the used accumulator elements. However, for reasons of weight, the number of spacers should be kept as low as possible.

The construction and the arrangement of the fixing element 24 and of the spacers 26, 27 are such that accumulator elements which are placed on the bottom plate 12 of the battery container 10 and which by means of their longitudinal axes are aligned parallel to the longitudinal direction y of the bottom plate 12, are fixed and supported in a row-type arrangement. The arrangement of the accumulator elements in this case takes place parallel to the air slots 22 and between these on supporting surfaces 28 provided for this purpose. The precise construction of the fixing element 24 and of the spacers 26, 27 as well as the method in which the battery container is filled with accumulator elements will be described in detail in the following.

Figure 3:
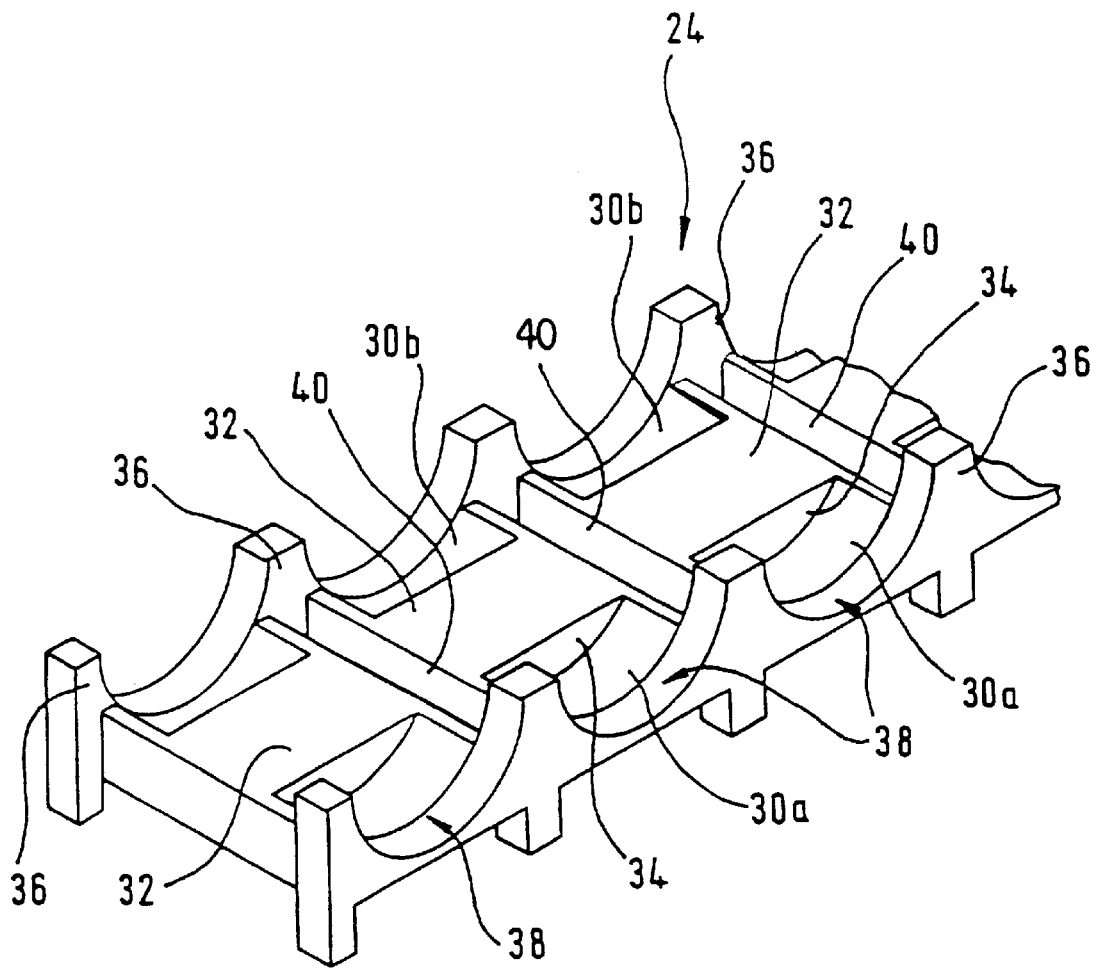
FIG. 3 is a perspective partial view of a fixing element according to the invention as an enlarged cutout-type Representation III of FIG. 2.

For this purpose, as an enlarged cutout III of FIG. 2, FIG. 3 shows a perspective partial view of the fixing element 24 according to the invention. The fixing element 24 is essentially constructed as an oblong web in which pockets 30 are formed along each longitudinal side, which pockets 30 are provided for the form-locking accommodation of longitudinal ends of the accumulator elements to be arranged in the battery container 10. The pockets 30 essentially have the shape of a divided circle, with a radius which essentially corresponds to the radius of the accumulator elements to be received and is selected to be slightly larger in practice in order to ensure a form-locking accommodation.

Between pockets 30a, 30b constructed at opposite sides of the web of the fixing element 24, unchanged sections 32 are provided which, in their height, each correspond to the original web and which, in the direction of the pockets 30, represent essentially perpendicular stop faces 34 for the front ends of the accumulator elements to be placed therein. As illustrated in the example of FIG. 3, the edges of the pockets 30 can be lengthened at least in the area of the side wall of the fixing element 24 in the upward direction as vertical webs 36. The webs 36 rest form-lockingly against the jacket of an inserted accumulator element up to half its height and thus ensure a particularly good accommodation and holding and, in addition, are used for supporting another fixing element arranged above it, as described in detail in the following.

Two opposite pockets and the relatively elevated section 34 provided between these therefore each form a fixing section 38 for a pair of accumulator elements which are connected with one another in the longitudinal direction and which are fixedly connected with one another at their poles situated coaxially behind one another in the longitudinal direction and whose two front ends can be placed by means of an accurate fit and in a form-locking manner into opposite pairs of pockets 30a, 30b, so that the pole connector comes to be situated above the elevated section 32 and the front ends of the accumulator elements are fixed and supported in the horizontal and vertical direction in the pockets 30 and the stop faces 34.

Between adjacent elevated sections 32, essentially perpendicular air slots 40 are provided in each case between opposite webs 36, which air slots 40, when the fixing element 24 is fastened on the bottom plate, correspond with the air slots 20 provided in the bottom plate 12.

The fixing element 24 fastened in FIG. 2 on the bottom plate 12 therefore has eleven fixing sections 38.

FIGS. 4a to 4e show various views of two embodiments of the fixing element 24 according to the invention.

FIG. 4b is a top view of the fixing element 24 of FIG. 2 in a longer construction with sixteen fixing sections 38. Each fixing section comprises an opposite pair of pockets 30a, 30b and elevated sections 32 situated between these pockets, whose end walls represent stop faces 34 for front ends of accumulator elements to be placed in the pockets. A longitudinal air slot 40 is provided between each fixing section 38.

FIG. 4a is a sectional view of the fixing element 24 of FIG. 4b taken along section Line IVa—IVa. In this representation, as in the lateral view of FIG. 4c, feet 42 are visible by means of which the fixing element 24 can be inserted, preferably in a fixed manner, into the bottom plate 12 in recesses provided for this purpose.

FIG. 4e is a lateral view of another embodiment of a fixing element 24a according to the invention which essentially corresponds to the fixing element 24 of FIG. 4c, with the difference that, in the case of the fixing element 24a of FIG. 4e, the pockets 30a have no web 36 which is lengthened in the upward direction. FIG. 4d is a sectional view of the fixing element 24a of FIG. 4e taken along section Line IVd—IVd.

Figure 5A:
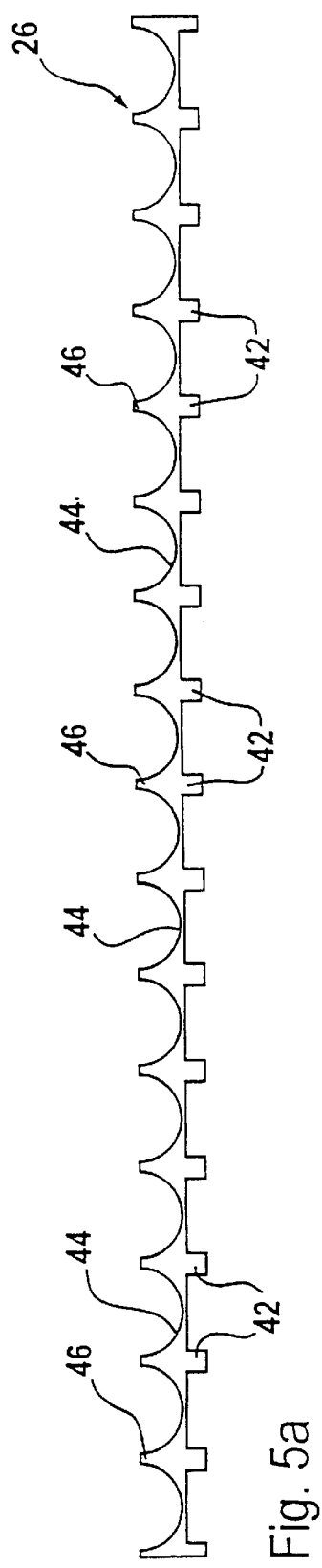
FIGS. 5a and 5b are views of two embodiments of a spacer according to the invention.
Figure 5B:
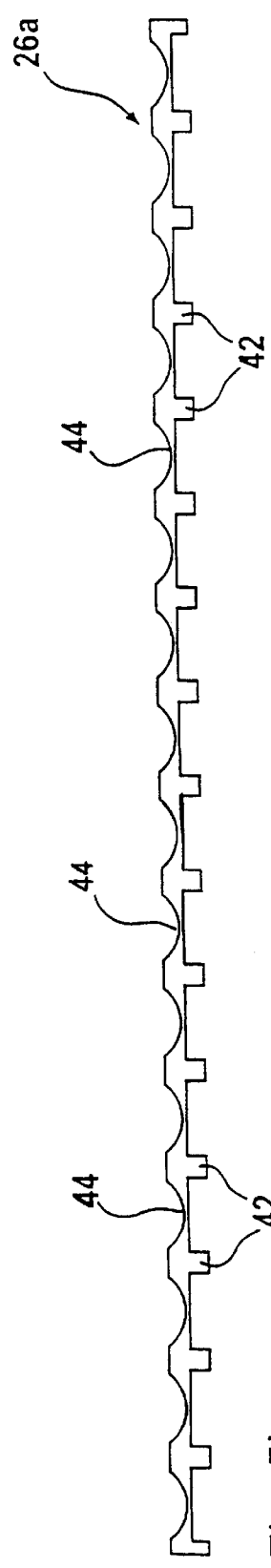

FIGS. 5a and 5b show two embodiments of spacers 26, 27 according to the invention. FIG. 5a is a lateral view of a spacer 26, 27, as mounted on the bottom plate 12 in the perspective view of FIG. 2. As illustrated in FIG. 2, in comparison to the fixing element 24, the spacers 26, 27 have a significantly narrower construction and have divided-circle shaped recesses 44 which correspond to the pockets 30 of the fixing element 24. In the embodiment illustrated in FIG. 5a, the divided-circle-shaped recesses 44 are lengthened in the upward direction by means of webs 46, while, in the embodiment illustrated in FIG. 5b, the webs 46 are absent, so that the recesses 44 represent relatively low indentations with a divided-circle-shaped recess. In both embodiments, feet 42 are provided again, by means of which the spacers can be inserted, preferably in a fixed manner, into corresponding recesses of the bottom plate 12

Figure 9:
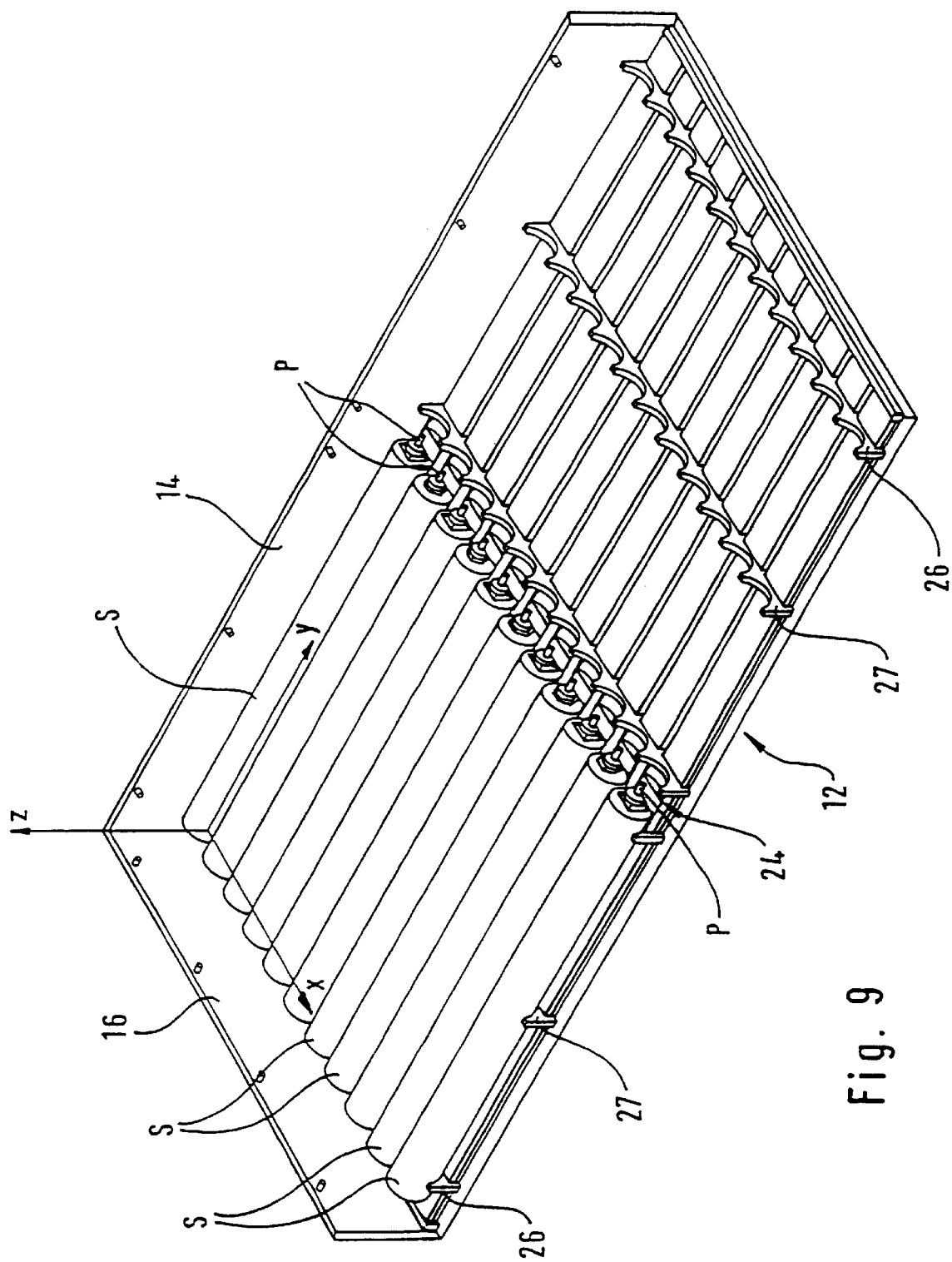
FIG. 9 is a perspective view of the arrangement of FIG. 2 where half the bottom plate is occupied by accumulator elements.

Corresponding to the perspective view of FIG. 9, when the battery container is filled according to the invention, accumulator elements S are placed onto the bottom plate 12 such that they are placed parallel to one another in a spaced manner side-by-side on the fixing element 24 and the spacers 26, 27, so that the front end of each accumulator element S comes to be situated in a pocket 30 of the fixing element 24 while acting upon the stop face 34. At the poles of the front ends of the accumulator elements S arranged in the fixing element 24, pole connectors P are mounted in order to permit a connection with additional accumulator elements S' which are to be connected in series longitudinally. In practice, the accumulator elements S and S', which are to be connected in series, are advantageously connected with one another by means of a pole connector in each case before the insertion in the battery container. The method of operation of the fixing element 24 when the accumulator elements are inserted is such that the front ends of mutually connected accumulator elements S, S' each act upon the stop face assigned to them, and thus a complete fixing of the accumulator elements S, S' exists in the horizontal direction. Furthermore, as a result of the stability of the fixing element 24, a support also exists in the vertical direction.

As mentioned above, the spacers 26, 27 have the purpose of preventing a bending of the relatively long accumulator elements S, S' and for maintaining a gap between adjacent accumulator elements which is used for the air circulation between the accumulator elements heating up during the operation.

Figure 8:
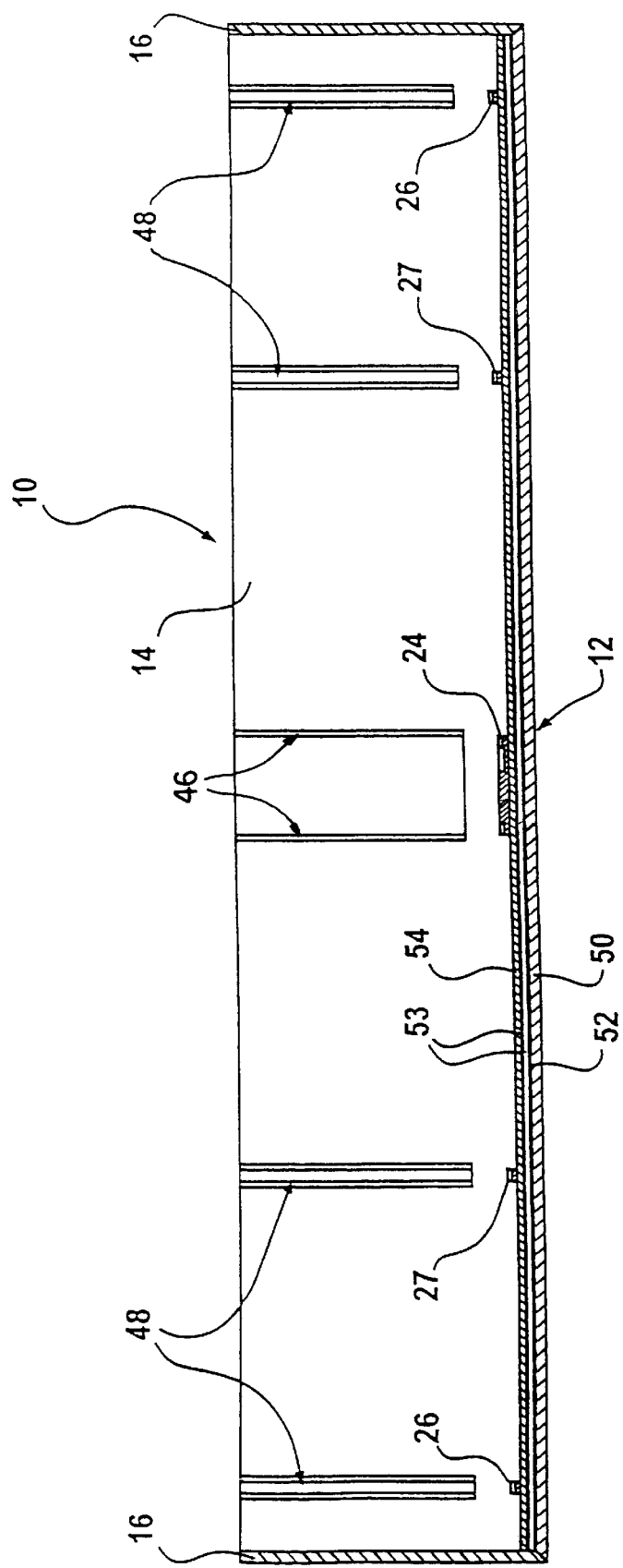
FIG. 8 is a longitudinal sectional view of a battery container according to the invention with a view onto a side wall.

In the case of a multilayer arrangement, an additional fixing element 24' and additional spacers 26', 27' are placed onto the first row of accumulator elements. For this purpose, as illustrated in the sectional view of FIG. 8, guide grooves 46 and 48 for additional fixing elements 24' and spacers 26', 27' are provided in the side walls 14 of the battery container 10, in which guide grooves 46 and 48, the fixing elements and spacers can be inserted and guided, whereby it is ensured that all fixing elements and spacers are to be situated exactly above one another. In the sectional view of FIG. 8 of the bottom plate 12 of the battery container 10, the above-mentioned sandwich structure of the bottom plate 12 for increasing its stiffness is also visible. The bottom plate 12 comprises a base plate 50 with sandwich plates 52, 53 arranged thereon, which preferably consist of aluminum, and optionally an insulating layer 54.

Figure 6A:
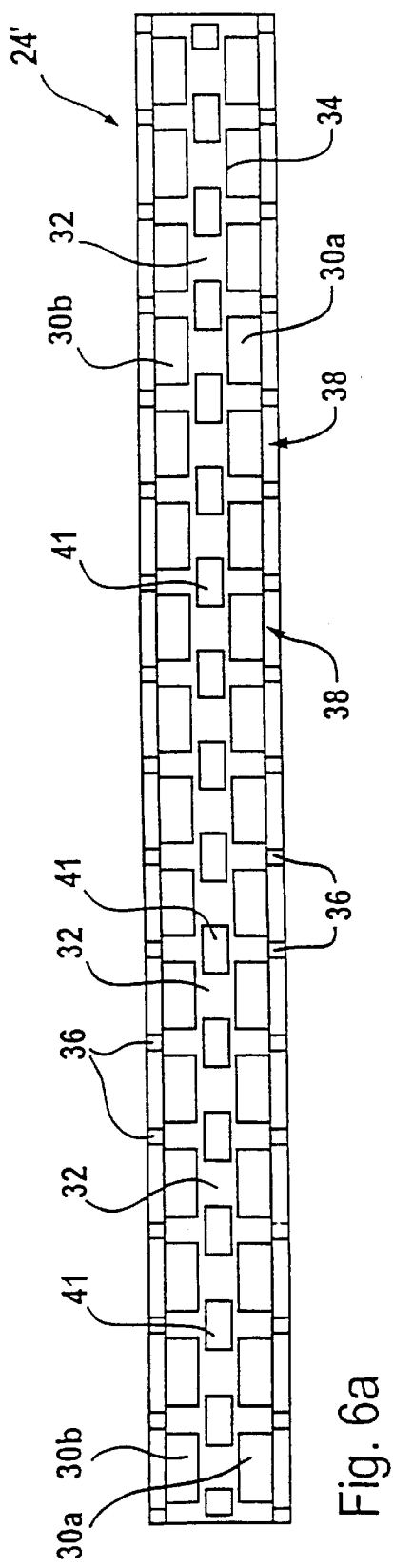
FIGS. 6a–6c shows several views of additional embodiments of a fixing element according to the invention.
Figure 6B:
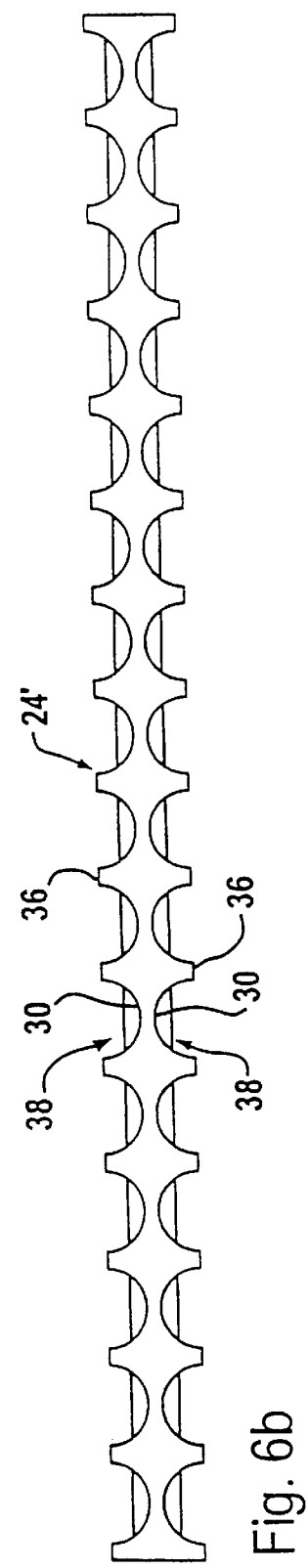
Figure 6C:
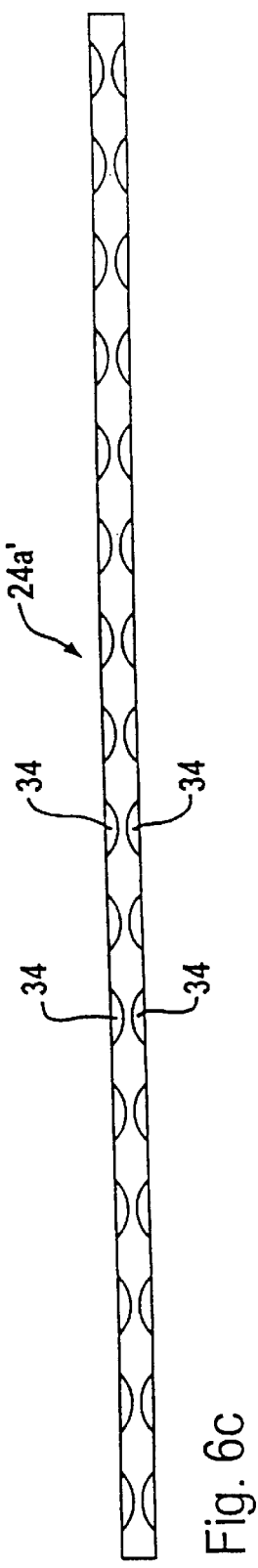
Figure 10:
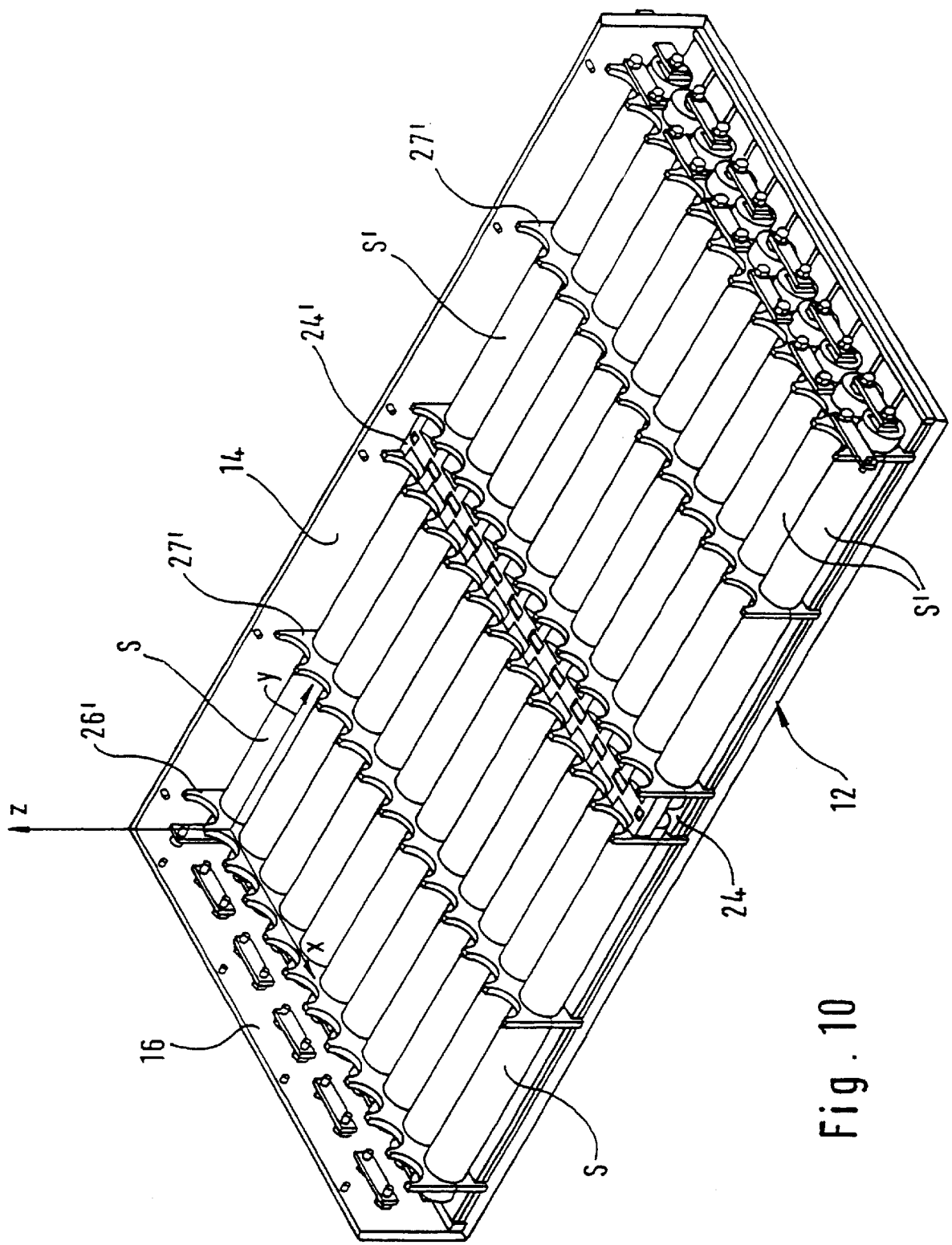
FIG. 10 is a perspective view of the arrangement of FIG. 9, shown where the bottom plate is completely occupied and additional fixing elements and spacers are applied to the accumulator elements.

The additional fixing element 24', which according to FIG. 10 is placed on the first layer of accumulator elements, is illustrated in FIGS. 6a to 6c in several views in two embodiments. FIG. 6a is a top view of the additional fixing element 24' which essentially corresponds to the view of FIG. 4b. Identical parts are provided with the same reference numbers as in FIG. 4b.

A first difference between the fixing element 24' of FIG. 6a and the fixing element 24 of FIG. 4b consists of the fact that the air slots 41 arranged between the fixing sections 38 for improving the stability of the additional fixing element 24' not fixedly arranged on a bottom plate or a cover plate no longer extend over the whole width of the fixing element, but are limited to the section between the pockets 30a, 30b and have a slightly wider construction. As a result, the flow around the poles or the pole connectors situated between the air slots 41 is also improved.

Another important difference between the additional fixing element 24' and the fixing element 24 of the bottom plate 12 consists of the fact that the additional fixing element 24' has fixing sections in the upward and downward direction. FIG. 6b shows an embodiment of the additional fixing element 24' with upward extending webs 36, while the lateral view of FIG. 6c shows an embodiment 24a' without upward-extending webs 36.

Figure 7:
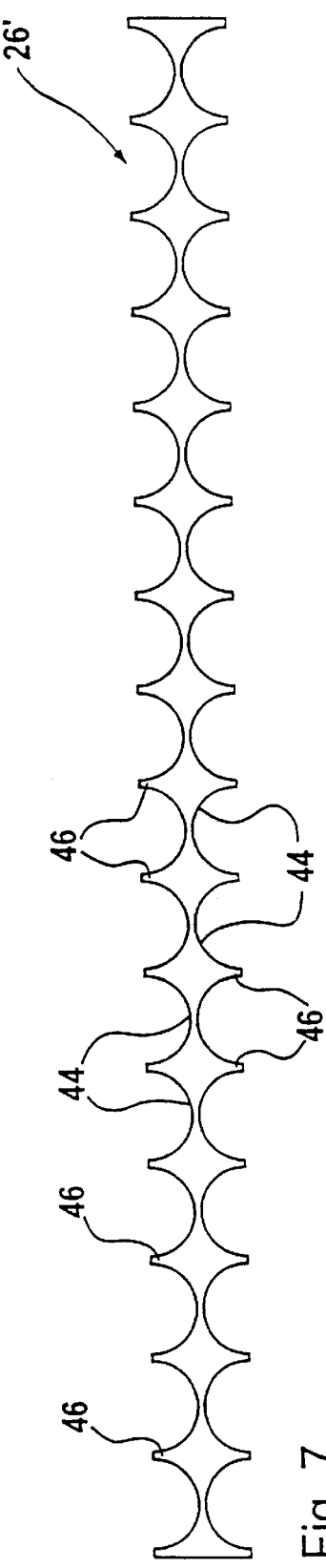
FIG. 7 is a view of another embodiment of a spacer according to the invention.

FIG. 7 is a lateral view of a spacer 261 which essentially corresponds to the spacer 26 of FIG. 5a but which also comprises divided-circle-shaped recesses 44 in the downward as well as in the upward direction.

The additional fixing element 241 and the spacers 26', 27' are placed on the first layer of accumulator elements S, S', as illustrated in FIG. 10. In this case, the pockets 30 or the divided-circle-shaped recesses 44 enclose the cylindrical jackets of the accumulator elements and are disposed on these. In the embodiment with elongated webs 36, 46 between the fixing sections 38 and the divided-circle-shaped recesses 44, the fixing elements and spacers fitted onto the first row of accumulator elements are disposed on the correspondingly assigned webs 36, 46 of the fixing elements and spacers situated below. As a result, a relieving of the jacket surfaces of the accumulator elements is achieved. In the case of accumulator elements with sufficiently firm jacket surfaces, fixing elements and spacers can be used without the extended webs, whereby additional weight is saved.

Figure 11:
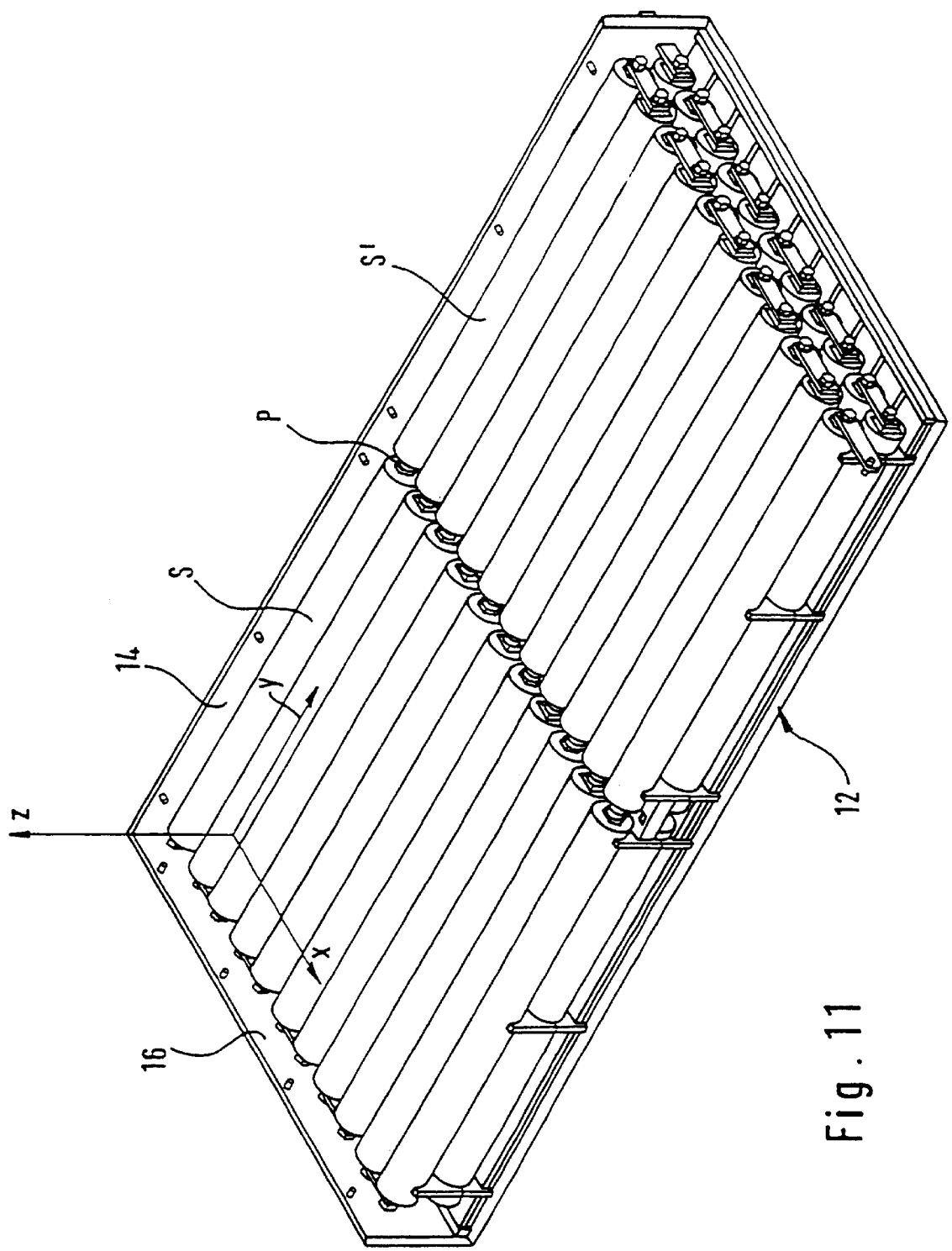
FIG. 11 is a perspective view of the FIG. 10 arrangement, shown with a completely inserted second layer of accumulator elements.
Figure 12:
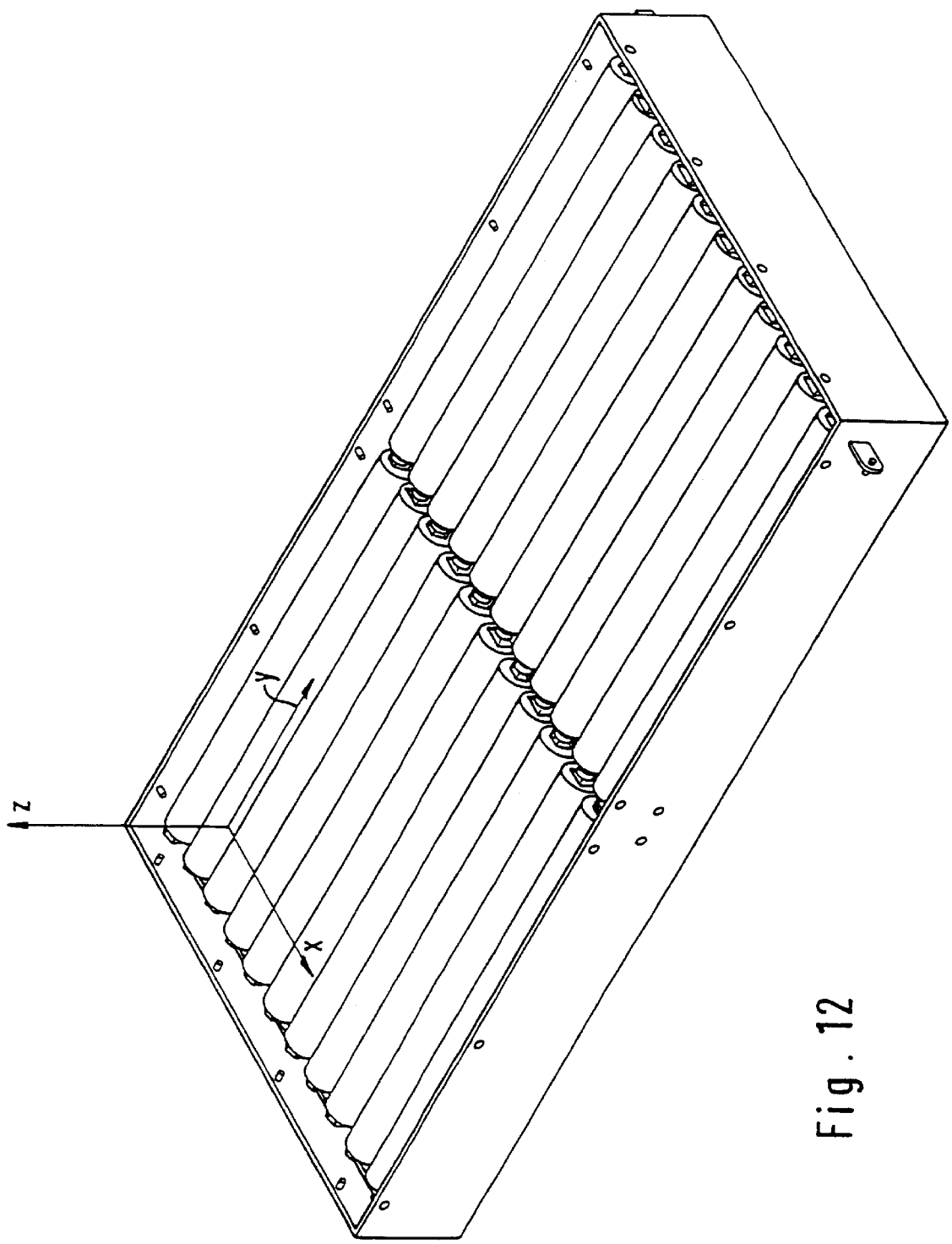
FIG. 12 is a perspective view of the FIG. 11 arrangement, shown with completely attached side and end walls.

According to FIG. 11, in a next step, additional accumulator elements S, S', connected by pole connectors P, are placed onto the additional fixing element 24' and the spacers 261, 27'. If the battery container is completely filled, the remaining side and end walls 14, 16 are attached to the bottom plate 12 and the cover plate 18 is fitted on.

The process for assembling the battery container can naturally vary in that, for example, for assembling the battery container, only the side walls 14 with the guide grooves for the fixing elements and spacers are attached to the bottom plate; the accumulator elements and the fixing elements and spacers to be inserted between individual layers of accumulator elements are inserted; and after, a complete loading, the cover plate with the end walls 16 fastened thereto is fitted on.

Figure 13:
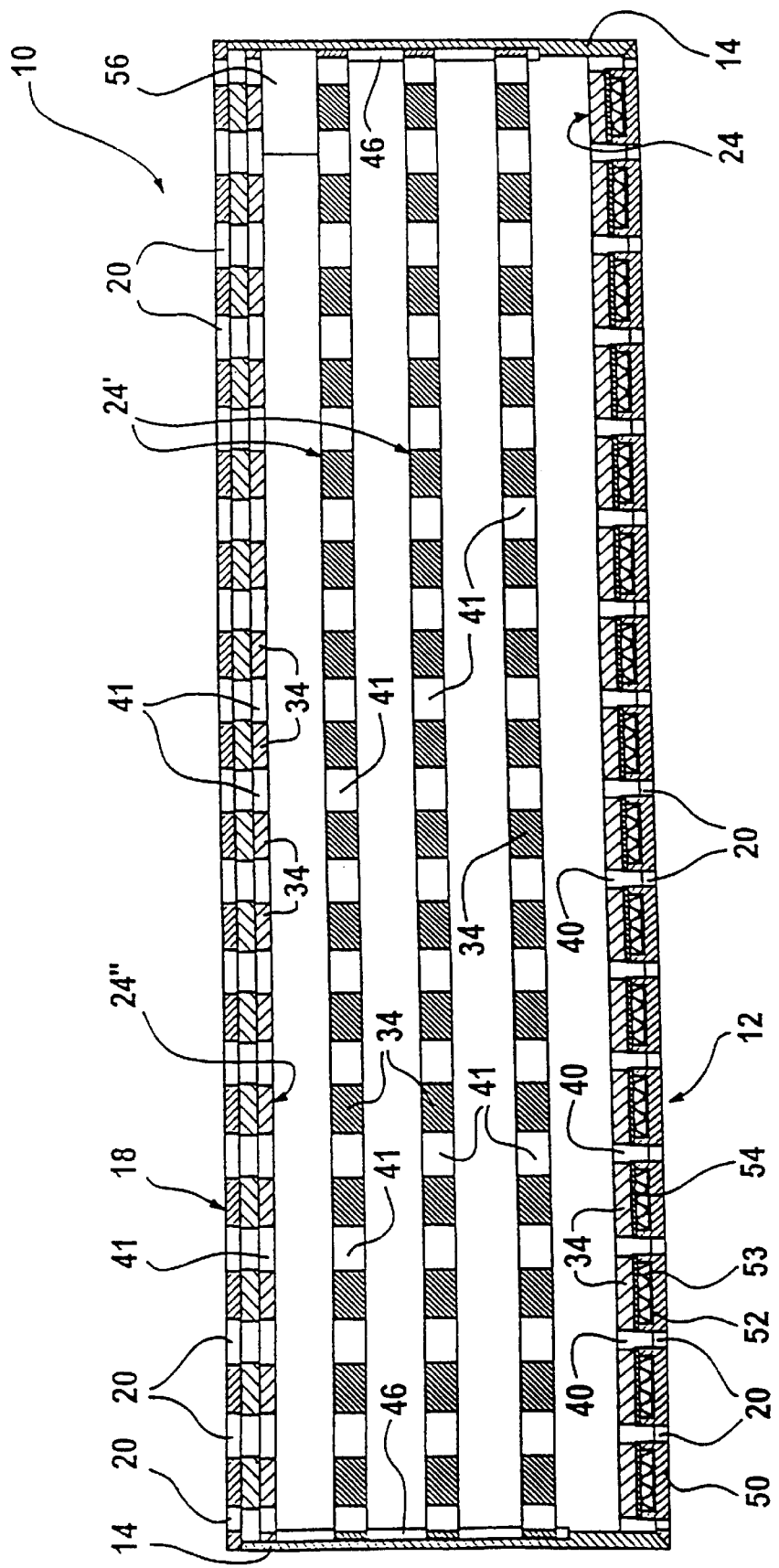
FIG. 13 is a sectional view of a battery container according to the invention taken along section Line XIII—XIII of FIG. 1, shown without accumulator elements.

FIG. 13 is a sectional view of a completely mounted battery container 10 taken along section Line XIII—XIII of FIG. 1, in which case, for reasons of clarity, the accumulator elements were not shown.

FIG. 13 is a sectional view of the construction of a battery container 10 according to the invention with a bottom plate 12, a fixing element 24 firmly fastened on the bottom plate 12; additional fixing elements 24' which are arranged in layers above the fixing element 24 and which are guided in grooves of the side walls 14; as well as a cover plate 18, on which a fixing element 24" is fastened which, in comparison to the bottom plate 12, points downward, the cover plate 18 being placed on the side walls 14 such that the fixing elements 24, 24" and the additional fixing elements 24' are arranged directly above one another. This is particularly important because, in this manner, the air slots 20 of the bottom plate 12 and of the cover plate 18 and the air slots 40 and 41 of the fixing elements 24, 24', 24" are arranged above one another and thus ensure the circulation of cooling fluid for moderating the temperature of the accumulator cells in the battery container 10. As illustrated in FIG. 13, the construction of the fixing element 24" fastened to the cover plate 18 varies slightly from that of the fixing element 24 fastened on the bottom plate 12 in that the air slots 41 are constructed corresponding to the additional fixing elements arranged between the individual layers of accumulator elements and in that a sandwich structure 52/53, as provided in the fixing element 24 of the bottom plate 12 for increasing the stiffness, can be eliminated because the demands on the bending resistance of the fixing element 24" on the cover plate 18 are not as high as on the fixing element 24 of the bottom plate 12.

Figure 14:
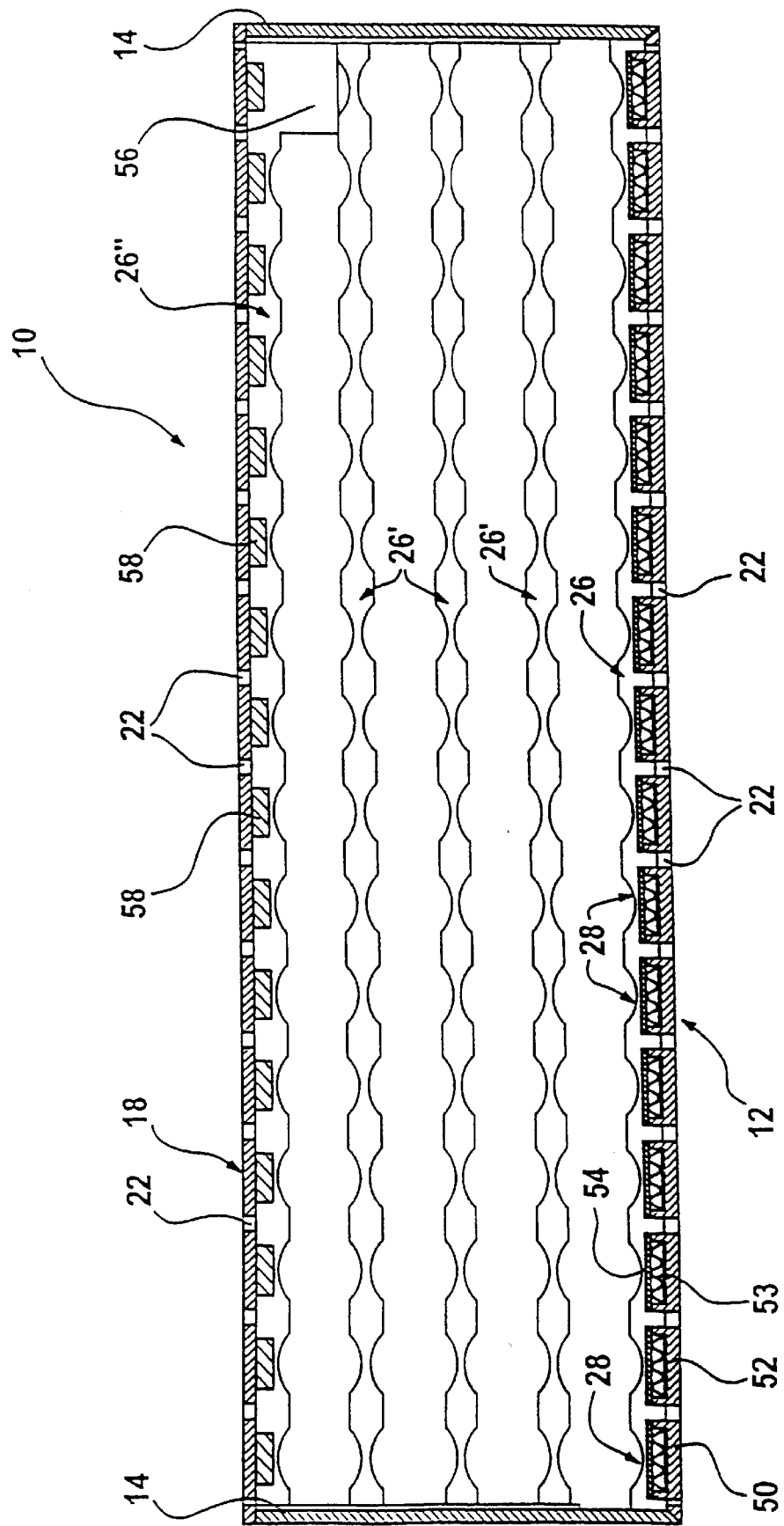
FIG. 14 is a sectional view of a battery container according to the invention taken along section Line XIV—XIV of FIG. 1, shown without accumulator elements.

FIG. 14 is another sectional view of the battery container 10 taken along section Line XIV—XIV of FIG. 1, in which case, again for reasons of clarity, the accumulator elements contained in the battery container 10 are not shown.

FIG. 14 is a cross-sectional view of the battery container 10 of FIG. 1 at a point away from the fixing element or the spacers with a view toward the spacers 26, 26' arranged behind the sectional plane. The bottom plate 12 consists of the above-described sandwich structure 50, 52, 53 and 54 which is interrupted by air slots 22. The sections of the bottom plate 12 situated between the air slots 22 form supporting surfaces 28 on which the accumulator elements are placed.

The uppermost spacer 26" on the cover plate 18 is constructed at the point situated at the right top in FIG. 14 with a lengthening 56 serving as a "space holder". The space holder 56 has the purpose of filling a site at least in the area of the spacer which is not to be occupied by an accumulator element, in order to represent a boundary for the adjacent accumulator element.

Projections 58 constructed on the cover plate 18 between the air slots 22 are, on the one hand, used for increasing the stiffness of the cover plate and, on the other hand, as surfaces acted upon by the accumulator elements situated underneath.

Figure 15:
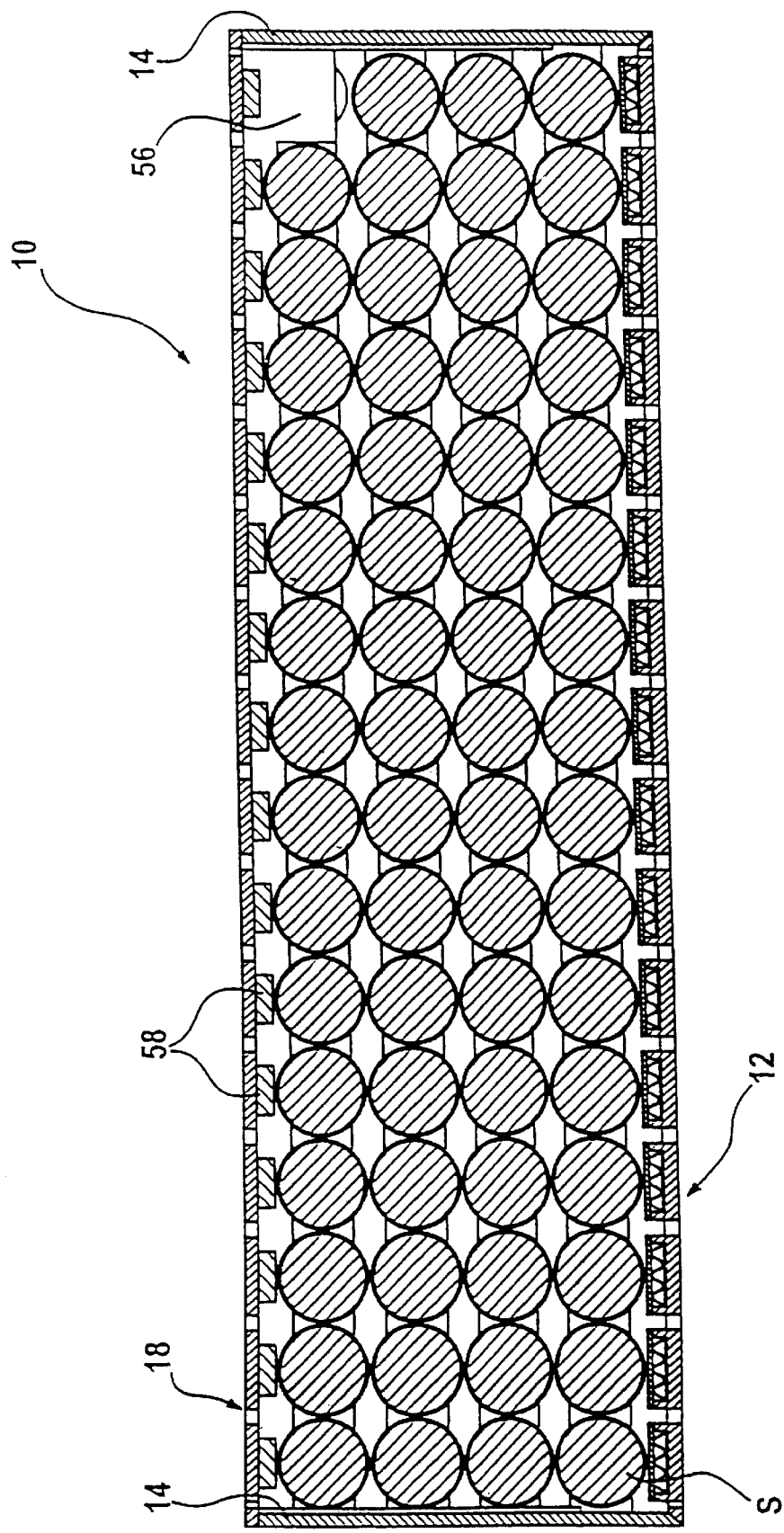
FIG. 15 is a sectional view similar to FIG. 14, shown with inserted accumulator elements.
Figure 16:
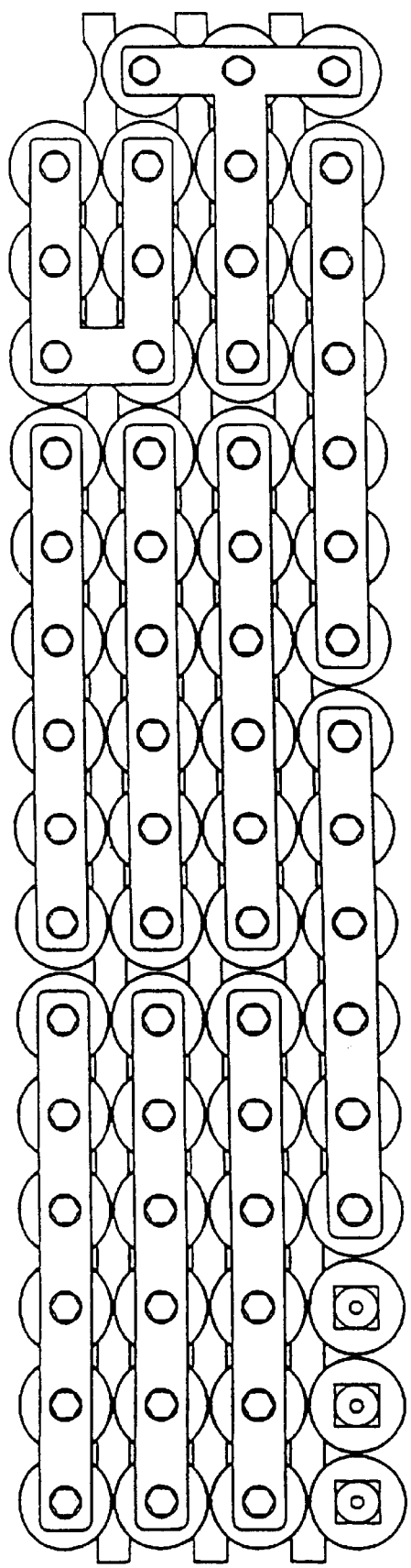
FIG. 16 is a view of the wiring of the accumulator elements of FIG. 15.

FIG. 15 shows the sectional view of FIG. 14 with accumulator elements S inserted therein.

Figure 17:
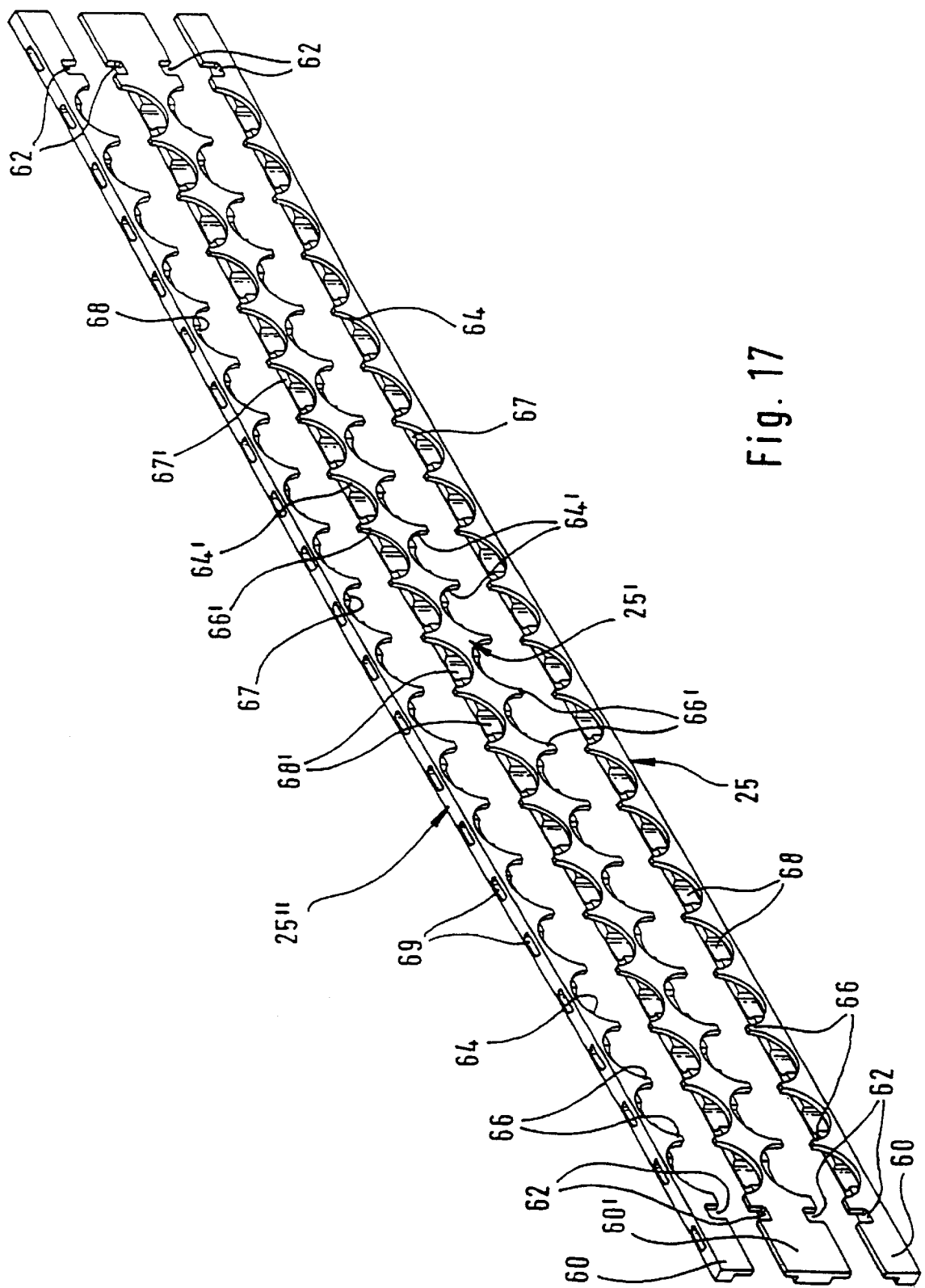
FIG. 17 is a perspective view of another embodiment of three fixing elements according to the invention.

Another embodiment of a fixing element according to the invention is illustrated in the perspective view of FIG. 17.

FIG. 17 is a perspective schematic view of three fixing elements 25, 25', 25" arranged above one another, which are particularly suitable for a use in battery containers into which accumulator elements are inserted which are connected with one another in the transverse direction. The fixing element 25 which is on the bottom in the representation of FIG. 17 is provided for the fastening on a bottom plate 12a of the a battery container 10, whereas the fixing element 25" which in the representation of FIG. 17 is situated on the top is provided for a fastening on a cover plate of the battery container 10a. The two fixing elements 25 and 25" essentially have the same constructions. They each have an elongated flat base element 60 on which a plurality of recesses 64 are provided along a longitudinal edge, which recesses 64 extend almost to the opposite longitudinal edge of the base element 60. The recesses 64 are constructed such that they are suitable for the form-locking accommodation of accumulator elements. Between the recesses 64, supporting webs 66 are arranged which rest on jacket surfaces of accumulator elements inserted in the recesses 64 and which are provided for the support of corresponding supporting webs 66 of a fixing element 25' or 25" arranged above them. In the embodiment illustrated in FIGS. 17 to 22, the recesses 64 are essentially semicircular for receiving circular accumulator elements S2.

Behind the recesses 64, the fixing elements 25, 25" each have a continuous transverse strip 67 which has a lower construction than the supporting webs 66 provided between the recesses. In the transverse strip 67, a plurality of profile guide grooves 68 are constructed which are each assigned to a recess 64 and which are used for guiding the pole of an accumulator element S2 inserted in the recess 64. The profile guide grooves 68 have a continuous construction in the fixing elements 25, 25", so that they form slots 69 at the opposite edge, which slots 69 are suitable for the guiding of incoming and outgoing air.

The fixing element 25' which is in the center in the illustration of FIG. 17, in contrast to the two above-described fixing elements 25, 25", has a wider, that is, higher base element 60' on which, at both longitudinal edges, a plurality of recesses 64' each arranged on the opposite side are provided. Behind the recesses, a transverse strip 67' is again provided which extends along the entire length of the fixing element 25', in which transverse web 67' profile guide grooves 68' are constructed which extend along the entire length of the transverse web 67', each profile guide groove 68' being assigned to two recesses 64' of the fixing element 25' respectively situated above one another.

Furthermore, recesses 62 are constructed at the longitudinal ends of the fixing elements 25, 25', 25", on the longitudinal edges provided with the recesses 64. The recesses 62 are arranged such that two recesses 62 respectively, when the fixing elements are placed above one another, form an air slot for a horizontal guiding of cooling fluid.

The base elements of the fixing elements and the transverse strips are preferably constructed in one piece and consist of plastic, particularly RPC.

Figure 18:
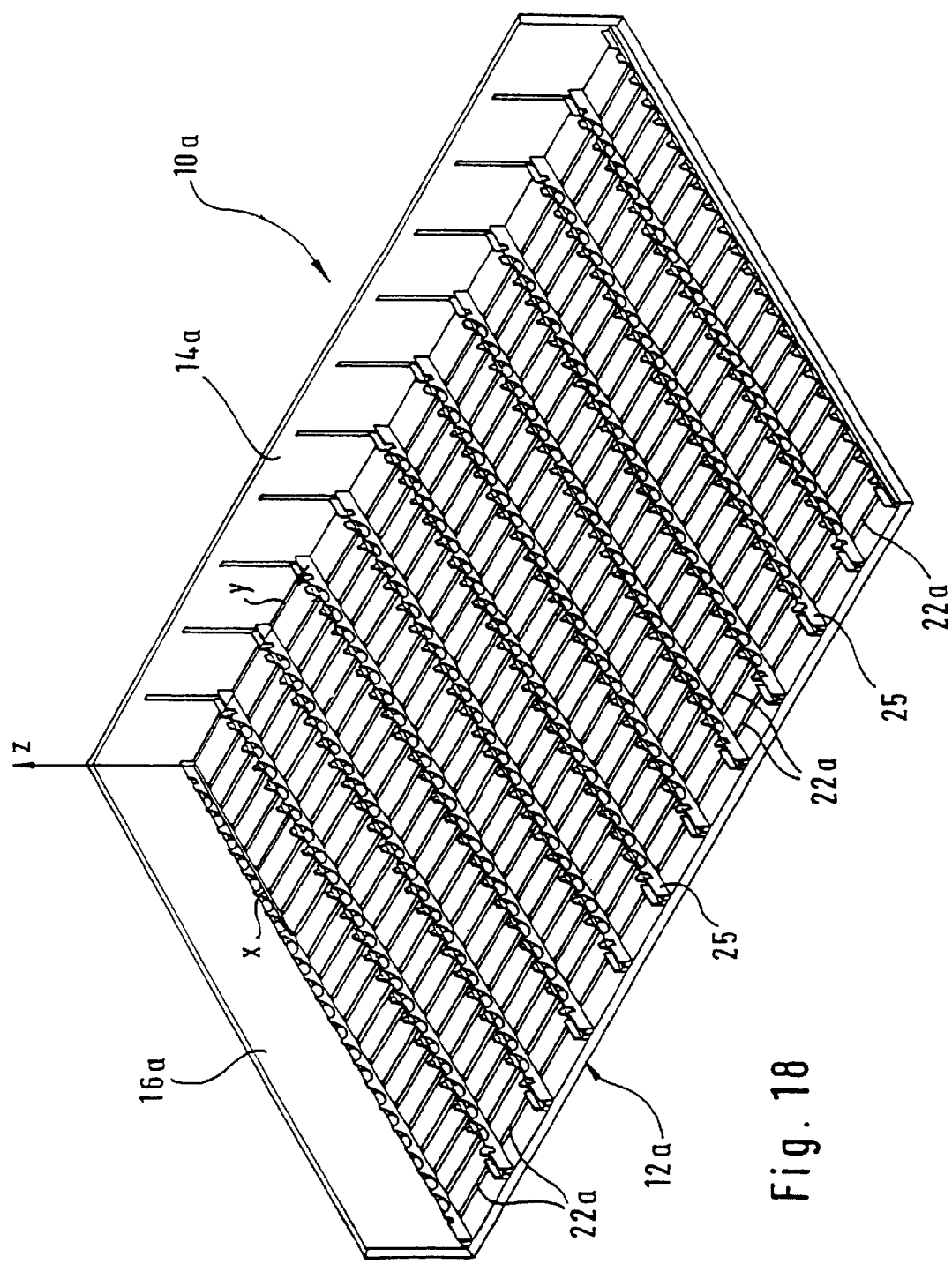
FIG. 18 is a perspective view of a bottom plate of a battery container according to the invention with fixing elements of FIG. 17.

FIG. 18 illustrates the arrangement of fixing elements 25 on the bottom plate 12a of a battery container 10a. Similar to the embodiment described with reference to FIG. 2, the bottom plate 12a has air slots 22a.

Figure 19:
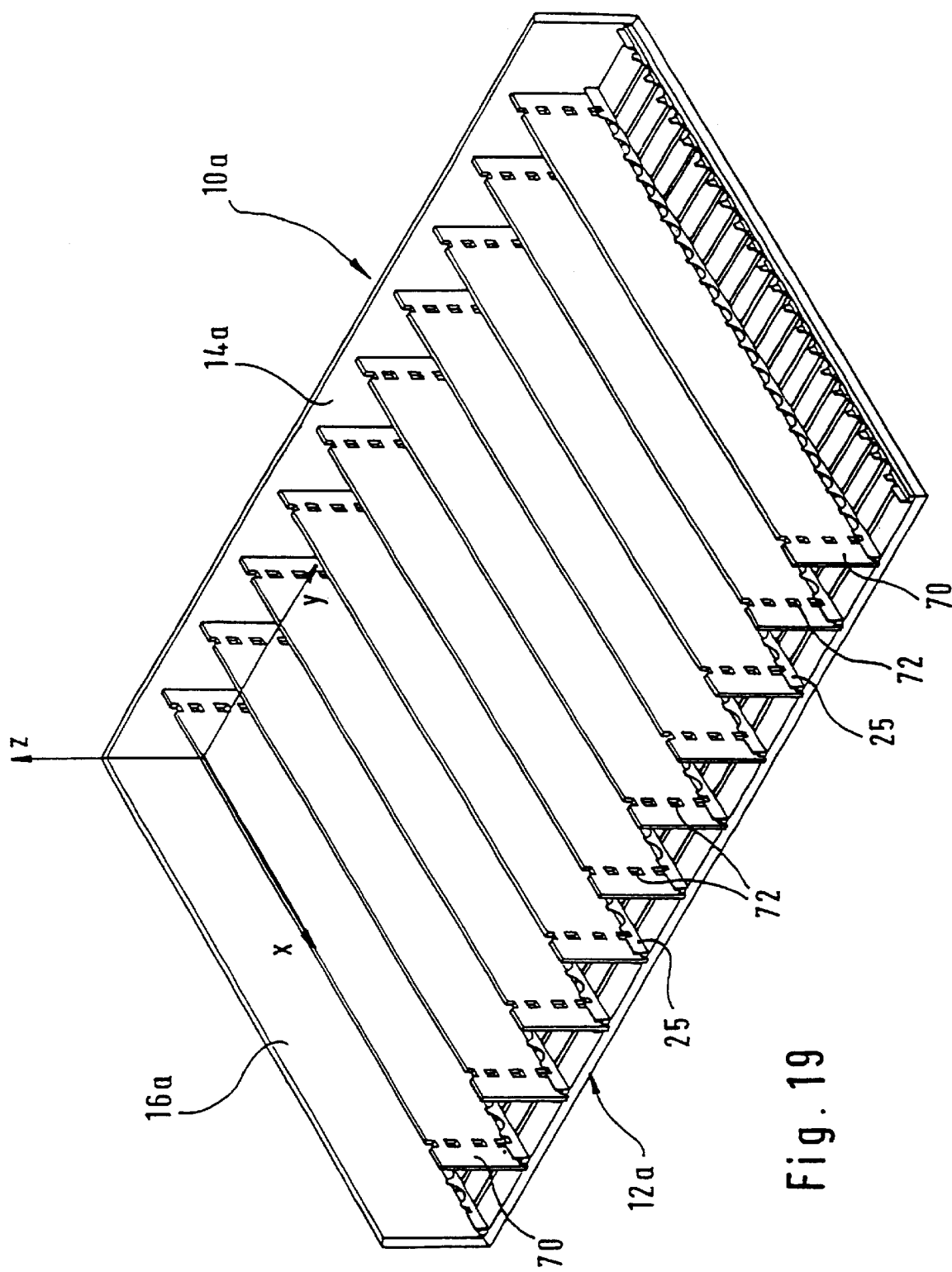
FIG. 19 is a view of the battery container of FIG. 18 with inserted insulating plates.
Figure 20:
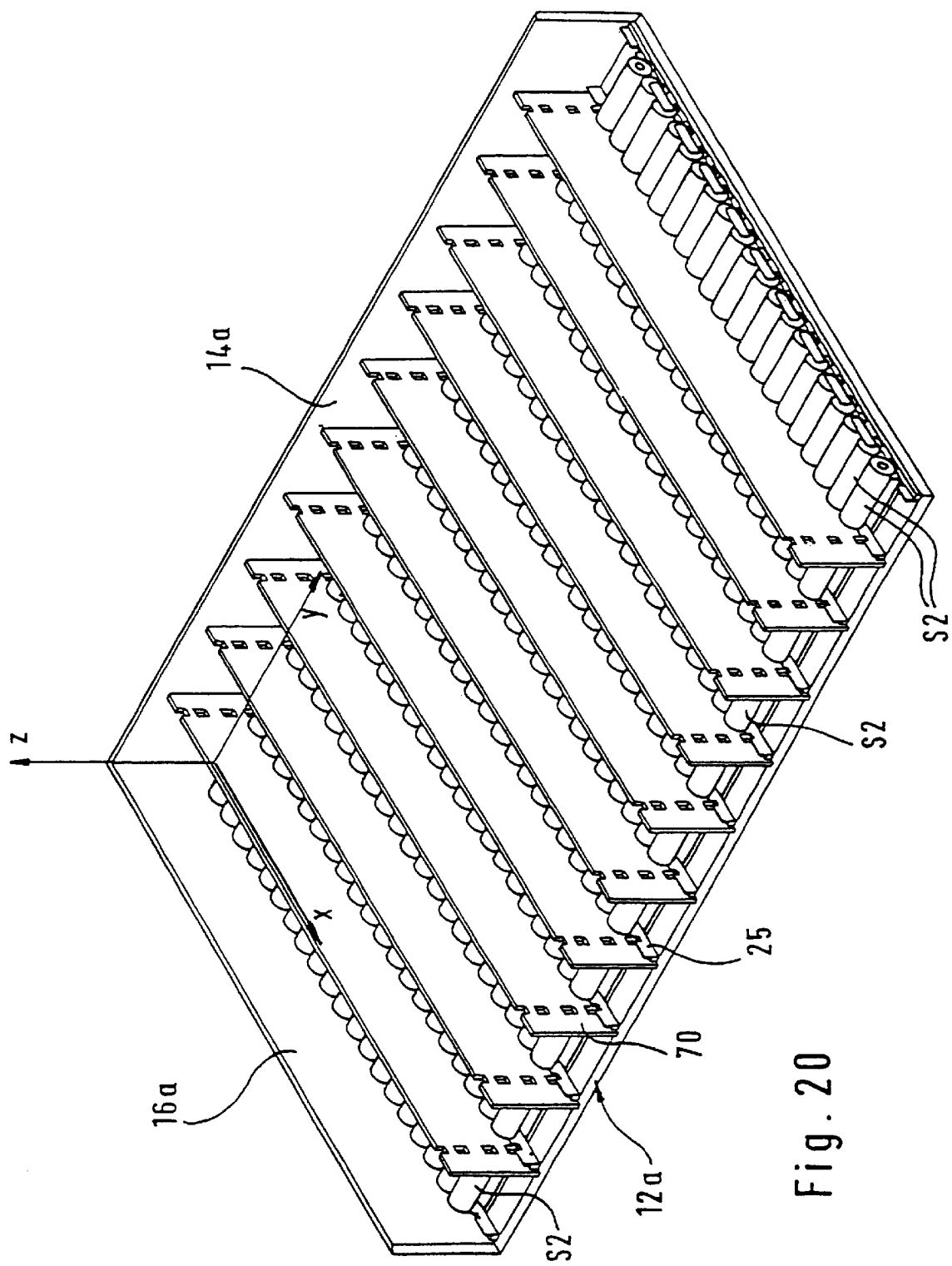
FIG. 20 is a view of the battery container of FIG. 19 with inserted accumulator elements.
Figure 21:
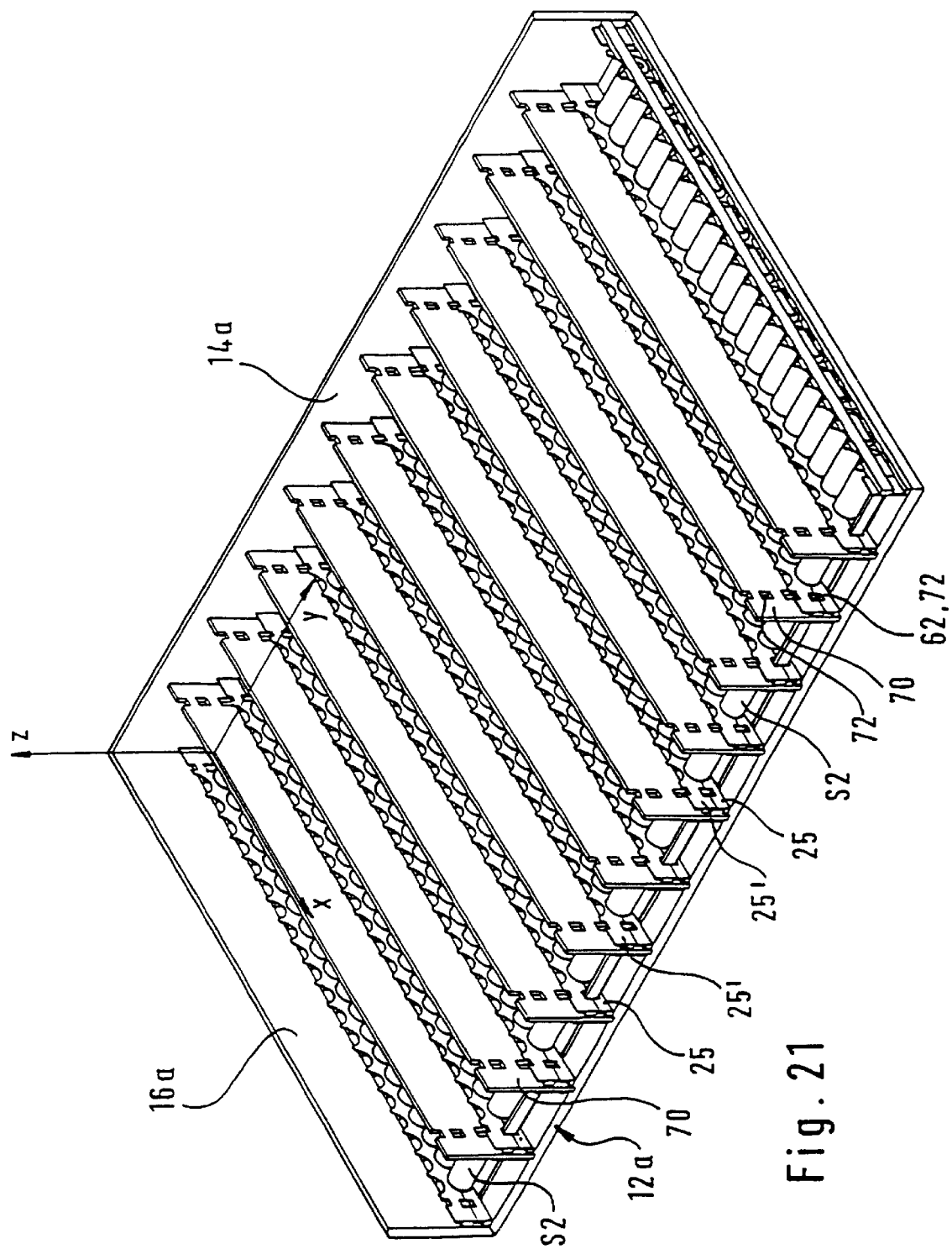
FIG. 21 is a view of the battery container of FIG. 20 with fixing elements fitted onto the first layer of inserted accumulator elements.

FIG. 19 shows the view of FIG. 18 with insulating plates 70 inserted between adjoining fixing elements 25. The insulating plates 70 extend along the entire height of the battery container 10a and are fitted in between two fixing elements which are parallel to one another and point toward one another with their transverse strips, whereby they cause an insulation between accumulator elements arranged in the longitudinal direction behind one another in the battery container, for avoiding short circuits, particularly in the event of collisions or the like. On their longitudinal ends, the insulating plates 70 have air slots 72 arranged above one another which, when the battery container is completely assembled, come to be congruent with the slots formed by the recesses 62 in the fixing elements 25, 25', 25" to be arranged above one another.

Analogous to the description of the embodiment illustrated in FIG. 10, additional fixing elements 25' are placed onto the first layer of accumulator elements S2 in the area between accumulator elements arranged behind one another in the longitudinal direction. In contrast to the embodiment illustrated in FIG. 10, the individual accumulator elements S2 are not connected with one another in the longitudinal direction but are each connected with an adjacent accumulator element so that a connection exists in the transverse direction. The totality of the "transverse modules" formed in such a manner are again connected with one another.

Figure 22:
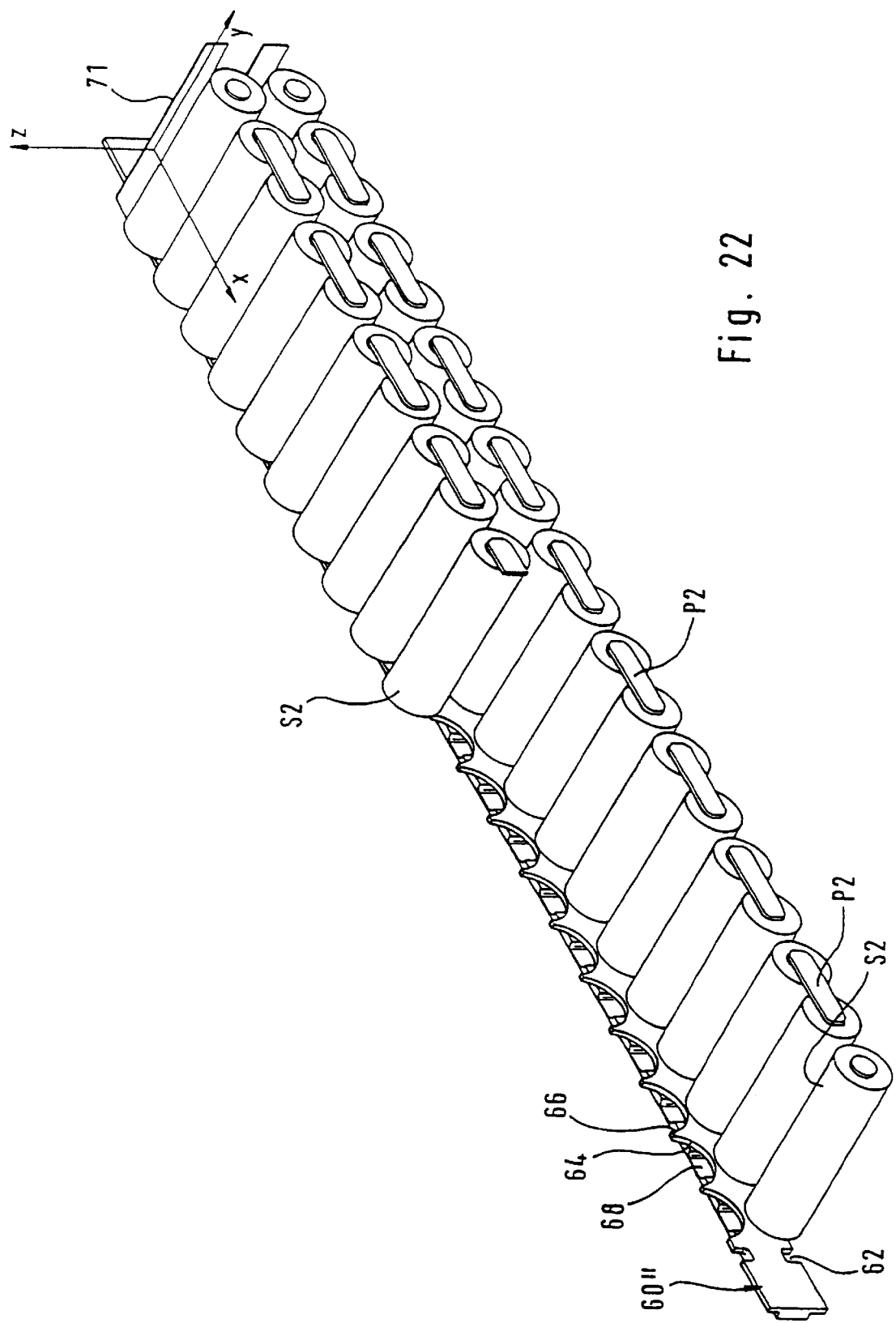
FIG. 22 is a cutout-type view of the fixing element according to FIG. 17 with one and a half rows of accumulator elements inserted therein.

As illustrated in FIG. 22, the connection in the transverse direction takes place by means of pole connectors P2 which, when the accumulator elements S2 are inserted into the fixing elements, come to be situated behind the webs 66 and transverse strips situated above one another. As a result of the lower construction of the transverse strips in comparison to the height of the supporting webs, transverse guides for the pole connectors P2 are produced between fixing elements placed above one another.

For a further improvement of the insulation, insulating plates 71 may also be provided which are arranged laterally of the accumulator elements.

Thus, a battery container is provided according to the invention which has a very simple, but highly stable construction and, while its own weight is low, can accommodate a very high weight load with respect to batteries.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Battery container for a plurality of cylindrical accumulator elements which are arranged parallel to one another in rows and/or layers essentially horizontally, comprising:
    a bottom plate,
    a cover plate,
    respective first fixing elements arranged on the bottom plate and the cover plate, which first fixing elements extend transversely to longitudinal axes of the accumulator elements and, with a form-locking action, fix and support the accumulator elements in the horizontal and the vertical direction, wherein each of the cover and bottom plates and at least one of the fixing elements has a slot for guiding incoming and outgoing air or cooling fluid, the slot being in fluid communication with the exterior of the battery container.

2. Battery container according to claim 1, wherein, in the case of a layered arrangement of the accumulator elements, additional fixing elements are provided which are arranged between two layers of accumulator elements respectively and which extend transversely to the longitudinal axes of the accumulator elements and, with a form-locking action, fix and support the accumulator elements in the horizontal and vertical direction.

3. Battery container according to claim 1, wherein the fixing elements are arranged in an area of at least one longitudinal end of the accumulator elements.

4. Battery container according to claim 3, wherein respective fixing elements are arranged on each longitudinal end of the accumulator elements.

5. Battery container for a plurality of cylindrical accumulator elements which are arranged parallel to one another in rows and/or layers essentially horizontally, comprising:
    a bottom plate,
    a cover plate,
    respective first fixing elements arranged on the bottom plate and the cover plate, which first fixing elements extend transversely to longitudinal axes of the accumulator elements and, with a form-locking action, fix and support the accumulator elements in the horizontal and the vertical direction, wherein one of the fixing elements is arranged only between a longitudinal end of one of the accumulator elements and a longitudinal end of another of the accumulators, which two accumulators are in a longitudinal connection with one another.

6. Battery container for a plurality of cylindrical accumulator elements which are arranged parallel to one another in rows and/or layers essentially horizontally, comprising:
    a bottom plate,
    a cover plate,
    respective first fixing elements arranged on the bottom plate and the cover plate, which first fixing elements extend transversely to longitudinal axes of the accumulator elements and, with a form-locking action, fix and support the accumulator elements in the horizontal and the vertical direction, wherein the fixing elements have pockets which accommodate the longitudinal ends of the accumulator elements in a form-locking manner.

7. Battery container according to claim 1, wherein the fixing elements have pockets which accommodate the longitudinal ends of the accumulator elements in a form-locking manner.

8. Battery container according to claim 6, wherein the slots for guiding cooling fluid are are operatively associated with the pockets that poles situated at the longitudinal ends of the accumulator elements are acted upon by a cooling fluid flow guided through the slots.

9. Battery container according to claim 1, wherein the fixing elements consist of polycarbonate plastic.

10. Battery container according to claim 9, wherein the fixing elements have a sandwich structure for increasing the stiffness of the fixing elements.

11. Battery container according to claim 1, wherein at least one spacer is provided which extends essentially parallel to the fixing elements and which prevents a bending of the accumulator elements and defines a gap between parallel accumulator elements.

12. Battery container according to claim 11, wherein the at least one spacer consists of polycarbonate plastic.

13. Battery container according to claim 12, wherein the at least one spacer has a sandwich structure for increasing the stiffness of the at least one spacer.

14. Battery container for a plurality of cylindrical accumulator elements which are arranged parallel to one another in rows and/or layers essentially horizontally, comprising:
   a bottom plate,
   a cover plate,
   respective first fixing elements arranged on the bottom plate and the cover plate, which first fixing elements extend transversely to longitudinal axes of the accumulator elements and, with a form-locking action, fix and support the accumulator elements in the horizontal and the vertical direction, wherein one of the fixing elements is arranged between a longitudinal end of one of the accumulator elements and a longitudinal end of another of the accumulators, which two accumulators are in a transverse connection with one another.

15. Battery container for a plurality of cylindrical accumulator elements which are arranged parallel to one another in rows and/or layers essentially horizontally, comprising:
   a bottom plate,
   a cover plate,
   respective first fixing elements arranged on the bottom plate and the cover plate, which first fixing elements extend transversely to longitudinal axes of the accumulator elements and, with a form-locking action, fix and support the accumulator elements in the horizontal and the vertical direction, wherein the fixing elements are arranged in an area of at least one longitudinal end of the accumulator elements, wherein the fixing elements are arranged between longitudinal ends of accumulator elements which are in a transverse connection with one another, and wherein the fixing elements have a number of recesses for the form-locking receiving of accumulator elements as well as pole guiding grooves for guiding the pole of an accumulator element inserted in the recess.

16. Battery container according to claim 15, wherein the grooves are constructed in a transverse strip arranged behind the recesses in the longitudinal direction of the accumulator elements to be inserted.

17. Battery container according to claim 16, wherein the transverse strip is lower than supporting webs arranged between the recesses.

18. Battery container according to claim 15, wherein the profile guiding grooves are used also for guiding cooling fluid.

19. Battery container for a plurality of cylindrical accumulator elements which are arranged parallel to one another in rows and/or layers essentially horizontally, comprising:
   a bottom plate,
   a cover plate,
   respective first fixing elements arranged on the bottom plate and the cover plate, which first fixing elements extend transversely to longitudinal axes of the accumulator elements and, with a form-locking action, fix and support the accumulator elements in the horizontal and the vertical direction, wherein the fixing elements are arranged in an area of at least one longitudinal end of the accumulator elements, wherein the fixing elements are arranged between longitudinal ends of accumulator elements which are in a transverse connection with one another, and wherein in the case of the fixing elements which are parallelly arranged along the longitudinal direction, insulating plates are provided at least in the area of the pole guiding grooves.

20. Battery container according to claim 14, wherein the fixing elements consist of polycarbonate plastic.

21. Motor vehicle having a self-supporting battery container according to claim 1.

22. Motor vehicle comprising a self-supporting battery container for a plurality of cylindrical accumulator elements which are arranged parallel to one another in rows and/or layers essentially horizontally, comprising:
   a bottom plate,
   a cover plate,
   respective first fixing elements arranged on the bottom plate and the cover plate, which first fixing elements extend transversely to longitudinal axes of the accumulator elements and, with a form-locking action, fix and support the accumulator elements in the horizontal and the vertical direction, wherein the battery container is arranged in a suitable opening of the vehicle body or the chassis of the motor vehicle.

23. Battery container for a plurality of cylindrical accumulator elements which are arranged parallel to one another in rows and/or layers essentially horizontally, comprising:
   a bottom plate,
   a cover plate,
   respective first fixing elements arranged on the bottom plate and the cover plate, which first fixing elements extend transversely to longitudinal axes of the accumulator elements and, with a form-locking action, fix and support the accumulator elements in the horizontal and the vertical direction, wherein, in the case of a layered arrangement of the accumulator elements, additional fixing elements are provided which are arranged between two layers of accumulator elements respectively and which extend transversely to the longitudinal axes of the accumulator elements and, with a form-locking action, fix and support the accumulator elements in the horizontal and vertical direction, and wherein the fixing elements are arranged in an area of at least one longitudinal end of the accumulator elements.

24. Battery container according to claim 23, wherein the bottom and cover plates and the fixing elements have slots for guiding incoming and outgoing air or cooling fluid.

25. Battery container according to claim 24, wherein the fixing elements have pockets which accommodate the longitudinal ends of the accumulator elements in a form-locking manner.

26. Battery container according to claim 25, wherein the slots for guiding cooling fluid are operatively associated with the pockets that poles situated at the longitudinal ends of the accumulator elements are acted upon by a cooling fluid flow guided through the slots.

27. Battery container according to claim 2, wherein at least one spacer is provided which extends essentially parallel to the fixing elements and which prevents a bending of the accumulator elements and defines a gap between parallel accumulator elements.

28. Battery container according to claim 1, wherein at least spacer is provided which extends essentially parallel to the fixing elements and which prevents a bending of the accumulator elements and defines a gap between parallel accumulator elements.

29. Battery container according to claim 1, wherein the fixing elements are arranged between longitudinal ends of accumulator elements which are in a transverse connection with one another.

30. Battery container for a plurality of cylindrical accumulator elements which are arranged parallel to one another in rows and/or layers essentially horizontally, comprising:

a bottom plate;

a cover plate; and respective first fixing elements arranged on the bottom plate and the cover plate, which first fixing elements extend transversely to longitudinal axes of the accumulator elements and, with a form-locking action, fix and support the accumulator elements in the horizontal and the vertical direction, wherein the bottom and cover plates and the fixing elements have slots for guiding incoming and outgoing air or cooling fluid, wherein the fixing elements are arranged between longitudinal ends of accumulator elements which are in a transverse connection with one another, and wherein the fixing elements have a number of recesses for the form-locking receiving of accumulator elements as well as pole guiding grooves for guiding the pole of an accumulator element inserted in the recess.

31. Battery container according to claim 30, wherein the grooves are constructed in a transverse strip arranged behind the recesses in the longitudinal direction of the accumulator elements to be inserted.

32. Battery container according to claim 31, wherein the transverse strip is lower than supporting webs arranged between the recesses.

* * * * *